(12) United States Patent
Anderson et al.

(10) Patent No.: US 9,130,838 B2
(45) Date of Patent: Sep. 8, 2015

(54) DEVICE MANAGEMENT SYSTEM, APPARATUS AND METHOD CONFIGURED FOR CUSTOMIZING A POWER FILTER

(71) Applicants: Greg Anderson, Brisbane, CA (US); Tom Haapanen, Heidelberg (CA); Kenji Hagiwara, Edgewater, NJ (US)

(72) Inventors: Greg Anderson, Brisbane, CA (US); Tom Haapanen, Heidelberg (CA); Kenji Hagiwara, Edgewater, NJ (US)

(73) Assignee: RICOH COMPANY, Tokyo (JP)

( * ) Notice: Subject to any disclaimer, the term of this patent is extended or adjusted under 35 U.S.C. 154(b) by 417 days.

(21) Appl. No.: 13/758,110

(22) Filed: Feb. 4, 2013

(65) Prior Publication Data
US 2014/0223316 A1 Aug. 7, 2014

(51) Int. Cl.
*H04L 12/26* (2006.01)
*H04L 12/24* (2006.01)

(52) U.S. Cl.
CPC ........ *H04L 43/0817* (2013.01); *H04L 41/0604* (2013.01)

(58) Field of Classification Search
CPC ............................... H04L 41/22; H04L 12/24
See application file for complete search history.

(56) References Cited

U.S. PATENT DOCUMENTS

| 8,296,756 | B1* | 10/2012 | Feeser et al. | 717/173 |
| 2005/0031162 | A1* | 2/2005 | Sagi et al. | 382/101 |
| 2012/0265865 | A1 | 10/2012 | Tanaka et al. | |
| 2012/0266073 | A1 | 10/2012 | Tanaka et al. | |
| 2013/0151692 | A1* | 6/2013 | White | 709/224 |

OTHER PUBLICATIONS

U.S. Appl. No. 13/758,082, Kenji Hagiwara et al., filed Feb. 4, 2013.
U.S. Appl. No. 13/758,089, Kenji Hagiwara et al., filed Feb. 4, 2013.
U.S. Appl. No. 13/758,097, Kenji Hagiwara et al., filed Feb. 4, 2013.
U.S. Appl. No. 13/758,103, Shun Tanaka et al., filed Feb. 4, 2013.
U.S. Appl. No. 13/758,116, Greg Melendez et al., filed Feb. 4, 2013.

* cited by examiner

*Primary Examiner* — Ebrahim Golabbakhsh
(74) *Attorney, Agent, or Firm* — Cooper & Dunham LLP

(57) ABSTRACT

Systems, apparatuses and methods are provided for managing information technology devices through a network, in which a power filter can be customized to provide a dynamic and customized view of device status information, as well as to modify device settings, of the devices.

20 Claims, 37 Drawing Sheets

DEVICE DATA

| Name | Manufacturer | IP address | Device Age | Status | Firmware Version | Department |
|---|---|---|---|---|---|---|
| MFP 301A | Company A | 172.16.121.255 | 2 years | Maximum storage capacity reached | 10.2.1 | IT |
| Printer 302A | Company B | 172.16.121.23 | 3 years | Ready | 2.009 | Accounting |
| Scanner 303A | Company A | 172.16.121.25 | 6 months | Sleep mode | 11.1.1 | Legal |

Fig. 5A

DEVICE SETTINGS INFORMATION

| Setting Name | Setting Type | Default Value | Options |
|---|---|---|---|
| Paper Size | Print | Letter | A4, Legal, Letter, Executive, A5, A6, B5, B6 |
| Duplex | Print | No | Yes, No |
| Pages Per Sheet | Print | 1 | 1, 2-in-1, 4-in-1, 9-in-1, 16-in-1, 25-in-1, 1 in 2x2 pages, 1 in 3x3 pages, 1 in 4x4 pages, 1 in 5x5 pages |
| Orientation | Print | Portrait | Portrait, Landscape |
| ... | ... | ... | ... |
| Time Zone | Date/Time | GMT – 05:00 | GMT, GMT + 01:00, GMT + 02:00 ... GMT – 01:00 |

Fig. 5B

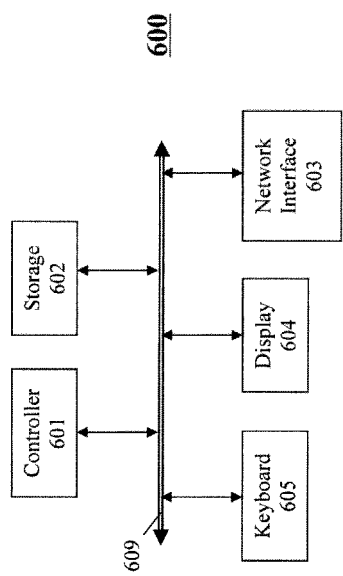

Devices – Device Management Tools (v1.0)

| Main Menu | Add | View/Configure Settings | Quick Filter | Uninstall | Help |

(−) IP Address
  (−) 24 (241)
    (−) 24.16 (241)
      24.16.11 (6)
      24.16.142 (4)
      24.16.71 (26)
      24.16.1 (15)
      24.16.225 (41)
      24.16.17 (35)
      24.16.18 (71)
      24.16.1 (27)
      24.16.0 (16)

(+) Models
(+) Asia
(+) Europe
(+) North America
(+) South America

| Add Filter | Edit/Delete |

(choose power filter)

| Device Name | Address | Serial No. | Status | Error/Warning |
|---|---|---|---|---|
| Zebra XL P001 | 24.16.11.1 | Z000140192 | On | Paper Jam |
| Zebra XP M2 | 24.16.11.2 | Z002002595 | On | Tray Open |
| Zebra XP C1 | 24.16.11.3 | Z001924859 | Off | Offline |
| GoodScan M11 | 24.16.11.4 | 0029582 | Sleep | None |
| HB12031 | 24.16.11.5 | 1000229586 | On | None |
| Noxide 1 | 24.16.11.6 | 9772338035 | Sleep | Toner Low |
| Rhino X001 SP | 24.16.142.2 | 0124325331 | On | Tray Open |
| Rhino X001 SP | 24.16.142.3 | 0120324647 | On | Paper Low |
| Rhino X001 SP | 24.16.142.4 | 0127347369 | On | None |
| Rhino X002 SP | 24.16.142.5 | 0129984848 | Off | Offline |
| Rhino X002 SP | 24.16.71.1 | 9526355 | Sleep | None |
| Unicopy 1095S | 24.16.71.2 | 9526991 | Sleep | None |
| Unicopy 1095X | 24.16.71.3 | 9526700 | On | Warming Up |
| Unicopy 1095X | 24.16.71.4 | 9526927 | Sleep | None |
| Unicopy 1095L | 24.16.71.5 | 9526284 | Off | Offline |
| Dyno Q125 | 24.16.71.6 | 17058929 | On | Paper |
| Dyno Q125 | 24.16.71.7 | 17042630 | Off | Offline |
| Dyno Q125 | 24.16.71.8 | 17042630 | On | Tray Open |
| Dyno Q125 | 24.16.71.9 | 17088375 | On | None |

Fig. 8A

| Device Name | Address | Serial No. | Status | Error/Warning |
|---|---|---|---|---|
| Zebra XL P001 | 24.16.11.1 | Z000140192 | On | Paper Jam |
| Zebra XP M2 | 24.16.11.2 | Z002002595 | On | Tray Open |
| Zebra XP C1 | 24.16.11.3 | Z001924859 | Off | Offline |
| Noxide 1 | 24.16.11.6 | 9772338035 | Sleep | Toner Low |
| Rhino X001 SP | 24.16.142.2 | 0124325531 | On | Tray Open |
| Rhino X001 SP | 24.16.142.3 | 0120324647 | On | Paper Low |
| Rhino X002 SP | 24.16.142.5 | 0127347369 | Off | Offline |
| Unicopy 1095X | 24.16.71.3 | 9526991 | On | Warming Up |
| Unicopy 1095X | 24.16.71.5 | 9526927 | Off | Offline |
| Unicopy 1095L | 24.16.71.6 | 9526284 | On | Paper Jam |
| Dyno Q125 | 24.16.71.7 | 17058929 | Off | Offline |
| Dyno Q125 | 24.16.71.8 | 17042630 | On | Tray Open |
| Rhino X001 SP | 24.16.18.1 | 0120325375 | On | Paper Low |
| Rhino X002 SP | 24.16.18.23 | 0127344586 | Off | Offline |
| Unicopy 1095X | 24.16.18.24 | 9526285 | On | Warming Up |
| Unicopy 1095X | 24.16.18.25 | 9526948 | Off | Offline |
| Unicopy 1095L | 24.16.18.26 | 9526194 | On | Paper Jam |
| Dyno Q125 | 24.16.18.32 | 17054613 | On | Tray Open |
| Dyno Q125 | 24.16.18.56 | 17048192 | On | Tray Open |

Fig. 8B

DEVICE MANAGEMENT SYSTEM, APPARATUS AND METHOD CONFIGURED FOR CUSTOMIZING A POWER FILTER

TECHNICAL FIELD

This disclosure relates to tools (such as systems, apparatuses, methodologies, computer program products, etc.) for managing information technology devices, and more particularly, such tools for customizing a power filter to provide a dynamic and customized view of device status information, as well as to modify device settings, of the devices.

BACKGROUND

In the current information age, information technology (IT) tools are extensively used in enterprises and other organizations in order to facilitate processing of documents and data. IT administrators typically have the responsibilities of monitoring and managing IT devices, such as computers, printers, scanners, multi-function devices (MFDs) and other network-connected or standalone devices.

Device management tools (such as application software, etc.) are available to IT administrators to assist the administrators to track, monitor and otherwise manage the devices through a network. Such device management tools allow the IT administrators to check device status to determine a need for repair or maintenance (such, e.g., "out of paper", "toner/ink low", "paper jam", etc.).

However, the number of IT devices connected to a network is generally increasing and, as a result, it is becoming increasingly more difficult for the IT administrators to locate the devices that they wish to examine, while using conventional device management tools. Although an IT administrator operating such tool can categorize the devices into groups, such groups are relatively static and the IT administrator still has a burden of having to manage and navigate through the groups to, for example, check the status of particular devices.

There remains a need for an improved tool that allow the IT administrator to readily limit the number of devices in the user interface view and more particularly to customize the view such that devices that are generally not of interest can be excluded from the view.

SUMMARY

Tools (for example, a system, an apparatus, application software, etc.) are described herein that can be provided to help an information technology (IT) administrator with management of IT assets in a networked IT system, and more particularly that permit the IT administrator to customize a power filter provide a dynamic and customized view of device status information, as well as to modify device settings, of the devices.

In an aspect of this disclosure, a device status acquiring unit obtains device status of plural devices through a network, and a status user interface unit provides a user interface to a user terminal, for dynamic specification of a particular power filter to selectively specify a limited subset of the plural devices, for display of status information. The user interface provided by the status user interface unit to the user terminal includes (i) a status information display part that displays the status information of a specific subset, specified by a selected filter, of the plural devices, and (ii) a filter creation part that provides plural status blocks, for user selection of one or more particular status blocks amongst the plural status blocks, to limit the subset of the plural devices for which the status information is displayed. The filter creation part displays, for each selected status block, a corresponding filter block with status condition options, for user selection for the particular power filter, and for each displayed status condition option, the status condition option is displayed with a device count indicating a number of matching devices matching the status condition option, amongst the plural devices. The particular power filter comprises a combination of the selected status condition options, and when the particular power filter is the selected filter, the status information display part displays the status information for only particular devices that match the combination of the selected status condition options, amongst the plural devices.

In another aspect, a status user interface unit can be configured to cause device counts of the displayed status condition options to be updated dynamically as device status of one or more devices is changed.

In another aspect, a status user interface unit can be configured to cause the user interface to be updated dynamically as a filter block is selected and as any one or more of the status condition options is selected.

In another aspect, a user interface can be configured to include a filter registration part that registers the particular power filter comprising the combination of selected status condition options, upon user instruction to register a particular power filter. Upon the user input of the instruction to register the particular power filter, the device status acquiring unit obtains the device status of the plural devices, and the status information display part determines the particular devices that match the selected status condition options included in the particular power filter.

In another aspect, upon user selection of a status condition option for the particular power filter, the device status acquiring unit obtains the device status of the plural devices, and the status information display part determines the particular devices that match the selected status condition option.

In another aspect, status condition options of a filter block can include at least one cascade level, and a status condition option can be cascaded with two or more cascaded status condition options.

In another aspect, a status information display part can be configured to display the status information in a device list view of only the particular devices, in the specific subset, that match the combination of the selected status condition options.

In another aspect, a status user interface unit can be configured to apply the power filter so that the device list view does not include status information of other devices, which are not in the subset, amongst the plural devices managed by the device management apparatus.

In another aspect, a status user interface unit can be configured to cause the status information displayed in the device list view to be updated dynamically as device status of one or more devices is changed.

In another aspect, a device status acquiring unit can be configured to obtain the updated device status information from the one or more devices.

In another aspect, a status user interface unit can be configured such that when the particular power filter be applied includes two or more selected status condition options from one filter block, each of the particular devices shown in a device list view matches at least one of the two or more selected status condition options from the one filter block.

In another aspect, a user interface provided by a status user interface unit can be a device management application to the user terminal, and such device management application can include a device settings user interface for modifying device settings of a selected device.

BRIEF DESCRIPTION OF THE DRAWINGS

The aforementioned and other aspects, features and advantages can be more readily understood from the following detailed description with reference to the accompanying drawings wherein:

FIG. 5A shows a sample device data, according to an exemplary embodiment;

FIG. 5B shows sample device settings information, according to an exemplary embodiment;

FIG. 6A shows a block diagram of an exemplary configuration of a device management apparatus, according to an exemplary embodiment;

FIG. 8A shows a sample screenshot of a user interface displayed to the user, according to an exemplary embodiment;

FIG. 8B shows a sample screenshot of a user interface displayed to the user, according to an exemplary embodiment;

DETAILED DESCRIPTION

Figure 1:
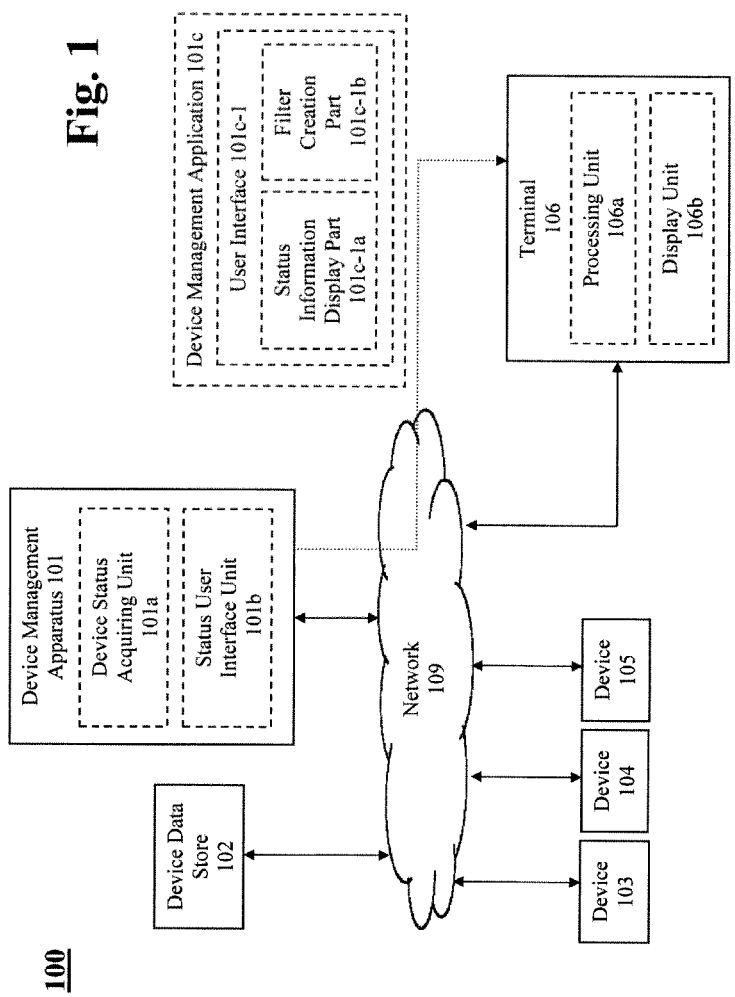
FIG. 1 shows a block diagram of a system for managing a plurality of network-connected devices, according to an exemplary embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Referring now to the drawings, wherein like reference numerals designate identical or corresponding parts throughout the several views, there is described tools (systems, apparatuses, methodologies, computer program products, etc.) for managing information technology devices, such as computers, printers, scanners, multi-function devices, and other network-connected, or standalone, devices (such as a projector unit, a video conference device, a telephone conference device, a shredding device, a stamp device, etc.), and for managing one or more networks to which a plurality of such information technology devices are connected.

For example, FIG. 1 shows schematically a system 100 for managing a plurality of devices connected to a network, according to an exemplary embodiment. The system 100 includes a device management apparatus 101, a storage 102, a plurality of network-connected devices 103-105, and a terminal 106, all of which are interconnected by a network 109.

The device management apparatus 101 includes a device status acquiring unit 101a and a status user interface unit 101b, and the terminal 106 includes a processing unit 106a and a display unit 106b.

The device status acquiring unit 101a is configured to obtain device status of the plurality of devices (e.g. devices 103-105) through the network (e.g. network 109).

For example, the device status acquiring unit 101a may communicate with one or more of the plurality of devices to collect and obtain device status information and various device data corresponding to each device. Many printers and other devices store data indicating their attributes or properties in a Management Information Base (MIB). The MIB may conform with the SNMP (Simple Network Management Protocol) protocol, and properties information can be obtained directly from the MIB through SNMP queries. In this way, the device status acquiring unit 101a is configured to discover and/or poll the corresponding plurality of devices to obtain the device status and other device data from the devices.

The device status acquiring unit 101a may obtain the device status information and other device data (such as the name, configuration information, error history, usage history, etc.) from each device by monitoring a network to which the device is connected (i.e. networks 109), and detecting and receiving one or more alert notifications or status updates transmitted to the network from any of the plurality of devices 103-105. For example, the device status acquiring unit 101a may receive the status updates by repeatedly transmitting requests to the 103-105 via the networks 109, inquiring as to the status of each network device. In response, each device may transmit status updates back to the device status acquiring unit 101a, wherein each status update indicates the device status and other information regarding the device, such as device name, status, configuration information, error history, usage history, whether an error exists or has occurred at the network device, etc. Alternatively, each device may automatically transmit status updates to the device status acquiring unit 101a (without waiting for requests or queries from the device status acquiring unit 101a), at regular intervals or, for example, whenever an error occurs at the device. The device management unit 101 may include locally resident hardware and/or software agents installed locally on each of the devices 103-105, which are configured to transmit the status updates directly to the device status acquiring unit 101a.

In addition to obtaining the device status information directly from the devices, the device status acquiring unit 101a may also acquire such data from a storage unit which may contain device data information previously acquired from the devices either by the device management apparatus 101 or other device management units (e.g. 204A-1 and 204B-1 shown in FIG. 2) in the network environment.

Further, the device status acquiring unit 101a may also communicate with other device management units or core management units (e.g. FIG. 4A), which may obtain the device status information (e.g. using any of the methods described above) for the device status acquiring unit 101a.

The device status information and other device data may be stored along with other data in one or more storage units external to the device management apparatus 101 (e.g. the device data store 102), or alternatively, in one or more storage units resident in the device management apparatus 101, and retrieved as needed.

The status user interface unit 101b is configured to provide a user interface for displaying status information of the plurality of devices in the network. Such status information may include "maximum capacity reached", "ready", "off", "sleep mode", "out of paper", "paper low", "toner/ink low", "tray open", "warming up", "paper jam", and so forth. The status information displayed by the status user interface unit 101b may also include any of the device data or device settings information discussed with reference to FIGS. 5A and 5B. The status information displayed by the status user interface unit 101b is not limited to those discussed in the present disclosure, and may include any information regarding the devices in the network environment.

For example, the status user interface unit 101b transmits a device management application 101c to the terminal 106, and causes the processing unit 106a to execute the device management application 101c. Upon execution of the device management application 101c by the processing unit 106a, the display unit 106b displays the user interface 101c-1. The user at the terminal 106 (e.g. an administrator of the network environment managed and monitored by the device management apparatus 101) can view the device status of the plurality of devices in the network and take any appropriate administrator action via the user interface 101c-1. The terminal 106 is further described infra with reference to FIG. 6B.

As shown in FIG. 1, the user interface 101c-1 includes a status information display part 101c-1a and a filter creation part 101c-1b. The status information display part 101c-1a displays the status information of a specific subset, specified by a selected filter, of the plurality of devices in the network, and the filter creation part 101c-1b provides plural status blocks, for user selection of one or more particular status blocks, to limit the subset of the plural devices for which the status information is displayed in the status information display part 101c-1a.

The user interface 101c-1, according to an exemplary embodiment, is further described below with reference to FIGS. 7 and 8A-8E.

Figure 7:
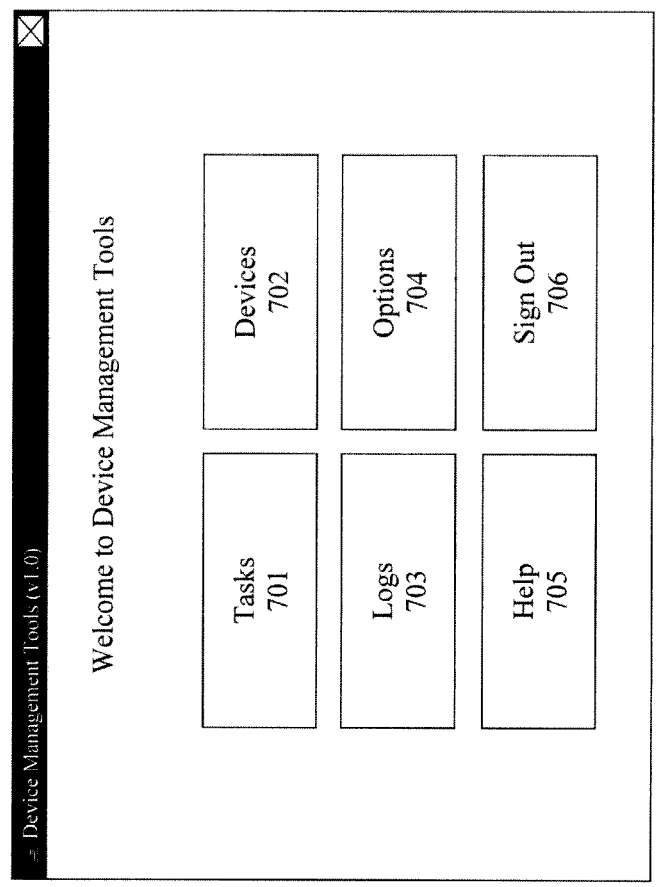
FIG. 7 shows a sample screenshot of a user interface displayed to the user, according to an exemplary embodiment.

FIG. 7 shows a screenshot of a main menu in an application software product for providing device management services, according to an exemplary embodiment. Such main menu screen is displayed on the terminal device of the user when the user successfully signs in, for example, by providing login credentials. In the example of FIG. 7, the main menu screen has the following buttons: "tasks" button 701 for displaying the list of tasks that can be performed by the user using the device management application, "devices" button 702 for displaying the list of network devices in the network environment, "logs" button 703 for displaying a log file which records various events that occur in the network environment managed by the device management application, "options" button 704 for allowing the user to configure various settings that govern the operation of the device management application, "help" button 705 for additional information about the application, and "sign out" button 706 for signing out of the device management application.

FIGS. 8A-8E illustrated a user interface for displaying the device status of a plurality of devices in a network environment, according to an exemplary embodiment.

For example, FIG. 8A shows a screenshot of the user interface displayed upon activating the "device list" button of FIG. 7. As shown in FIG. 8A, a list of devices connected to the network (or networks accessible by the user) is displayed to the user. At the top of the screen, buttons are provided for returning to the main menu screen ("main menu"), installing a new network device ("add"), viewing/configuring the settings for one or more existing devices ("view/configure settings"), activating a quick filter for limiting the devices displayed in the device list to those satisfying the quick filter ("quick filter"), uninstalling one or more existing devices ("uninstall"), and obtaining additional details regarding the device list ("help").

As discussed above, the status information display part 101c-1a displays the status information of a specific subset, specified by a selected filter, of the plurality of devices in the network. For example, as shown in FIG. 8A, when the user selects a group (e.g. IP Address→"24"→"24.16") on the panel on the left side of the screen, the panel on the right side of the screen displays the device status information of the subset of the plurality of devices that satisfy the selected group (i.e. devices whose IP addresses begin with "24.16").

In another exemplary embodiment, instead of a device list view, the user interface may display the devices in the network environment using icons, each icon representing a device or a group of devices.

Figure 8C:
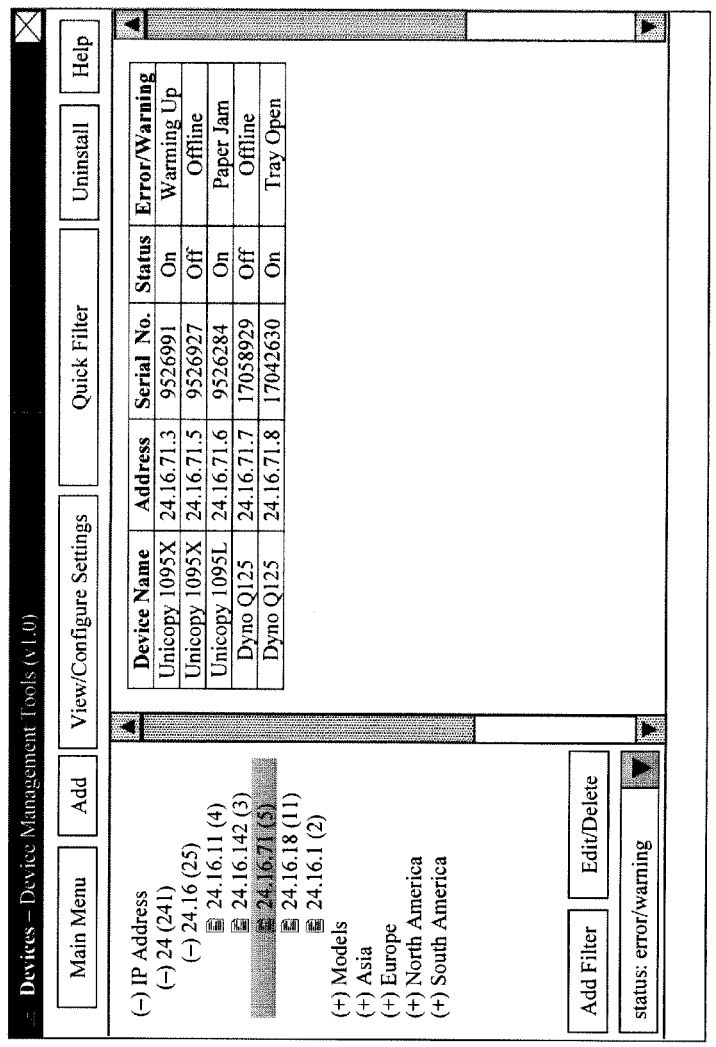
FIG. 8C shows a sample screenshot of a user interface displayed to the user, according to an exemplary embodiment.

Further, when the user selects a power filter which includes a set of status condition options, the panel on the right side of the screen displays the device status information of the devices that match the set of status condition options. For example, in FIG. 8B, a power filter labeled "status: error/warning" (which, for example, limits the devices displayed in the device list to those having errors and/or warnings (e.g. paper jam, toner/ink low, tray open, etc.). For example, such power filter has previously been created by the user, and any of the existing power filters may be modified or deleted by using the "edit/delete" button shown in the user interface of FIGS. 8A-8F. When the user selects the power filter "status: error/warning", any device not having any errors or warnings disappear from the device list view. Indeed, as shown in FIG. 8B, the devices having no errors or warnings (e.g. indicated by the error/warning value of "none"), such as the devices "GoodScan M11" and "HB12031" shown in FIG. 8A, are not displayed in the device list of FIG. 8B.

The user can further narrow down the device list by selecting another group that is more specific that the one currently selected. For example, when the user selects the group "24.16.71" under "IP Address", any device whose IP address does not begin with "24.16.71" disappears from the device list view, as shown in FIG. 8C.

Figure 8D:
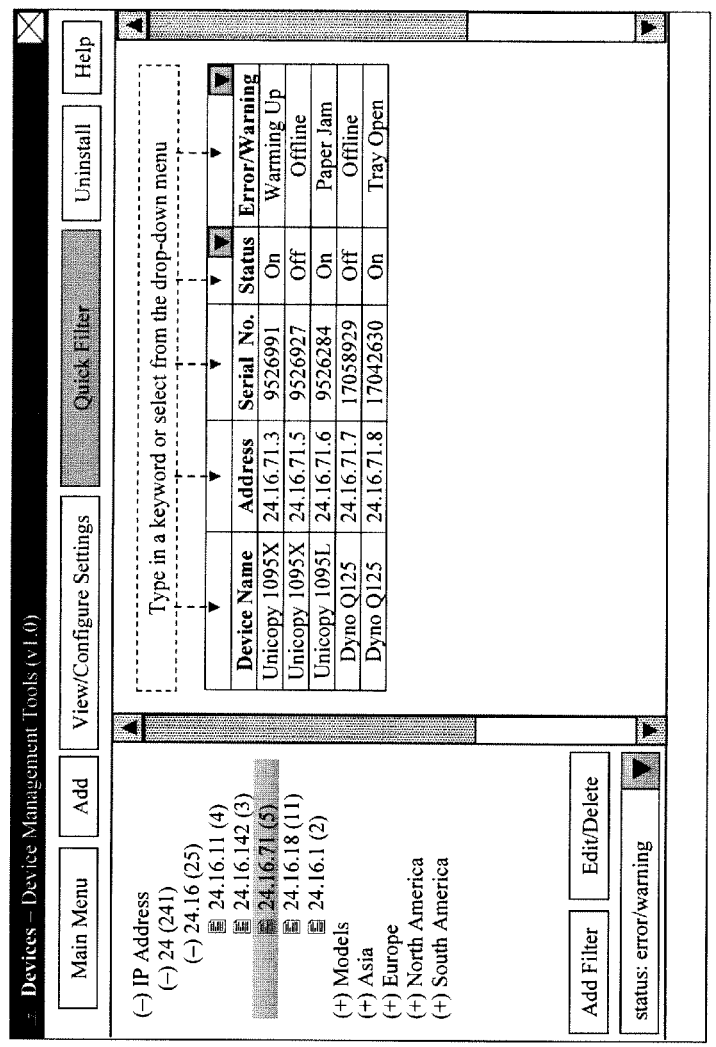
FIG. 8D shows a sample screenshot of a user interface displayed to the user, according to an exemplary embodiment.
Figure 8E:
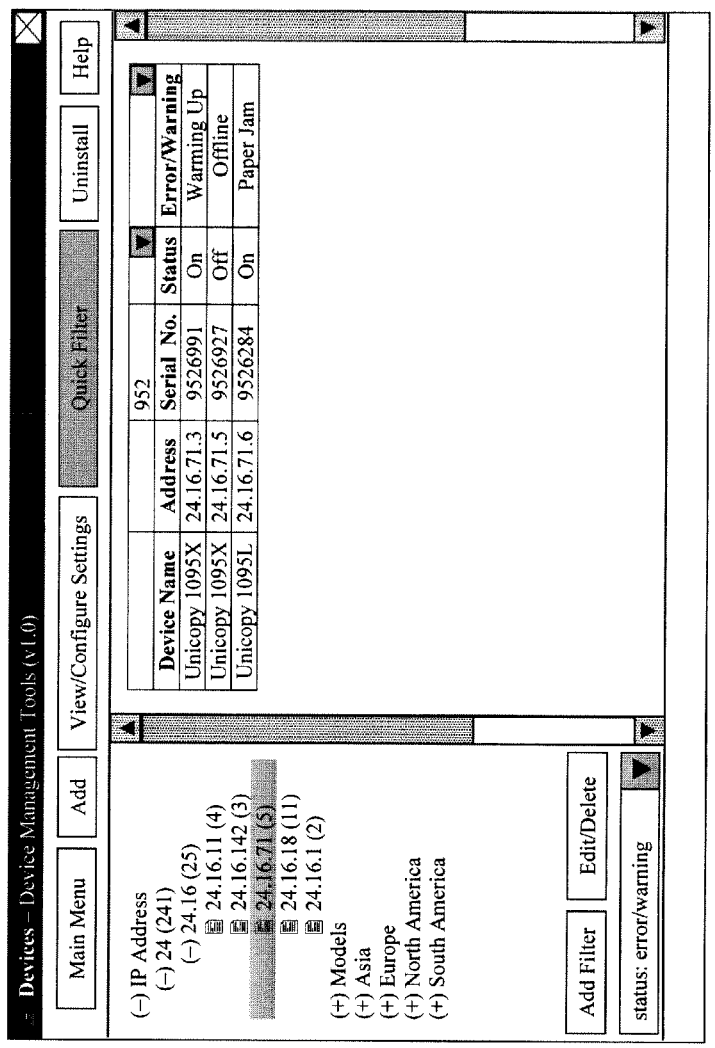
FIG. 8E shows a sample screenshot of a user interface displayed to the user, according to an exemplary embodiment.
Figure 8F:
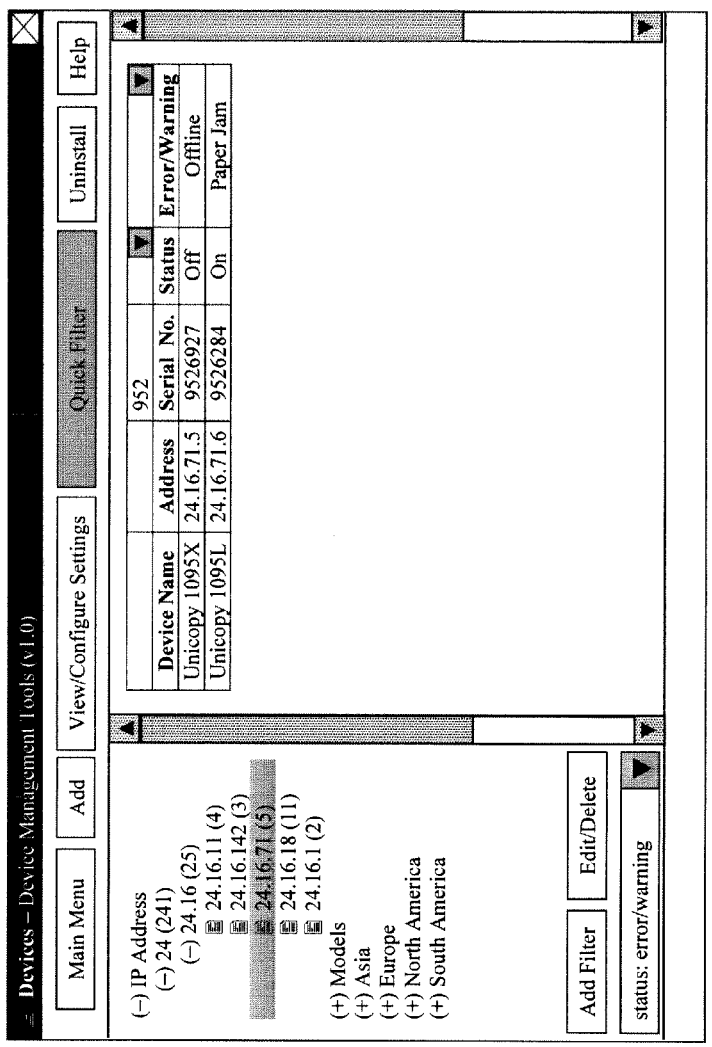
FIG. 8F shows a sample screenshot of a user interface displayed to the user, according to an exemplary embodiment.

The status information displayed by the status information display part 101c-1a can further be limited by using the "quick filter" button provided at the top of the screen. When the user activates the "quick filter" button, an additional row is added at the top of the device list, as illustrated in FIG. 8D. The user can type in numbers and/or characters in text fields (e.g. provided for the columns "device list", "address" and "serial no.", or select from one or more drop-down menus (e.g. provided for the columns "status" and "error/warning") to further limit the devices for which status information is displayed by the status information display part 101c-1a. As shown in FIG. 8D, the user interface indicates to the user where the user can type in a keyword or select from the drop-down menu. For example, in FIG. 8E, the number "952" has been typed into the text field (i.e. cell) above the "serial no." column. As a result, the devices displayed by the status information display part 101c-1a is limited to those having serial numbers that start with "952", as shown in FIG. 8E.

In addition, the devices for which status information is displayed by the status information display part 101c-1a may be dynamically updated, as the device status of one or more devices in the network environment is changed. For example, the device having an IP address of "24.16.71.3" (FIG. 8E) has disappeared from the device view list shown in FIG. 8F (e.g. due to the warming up being finished).

Figure 8G:
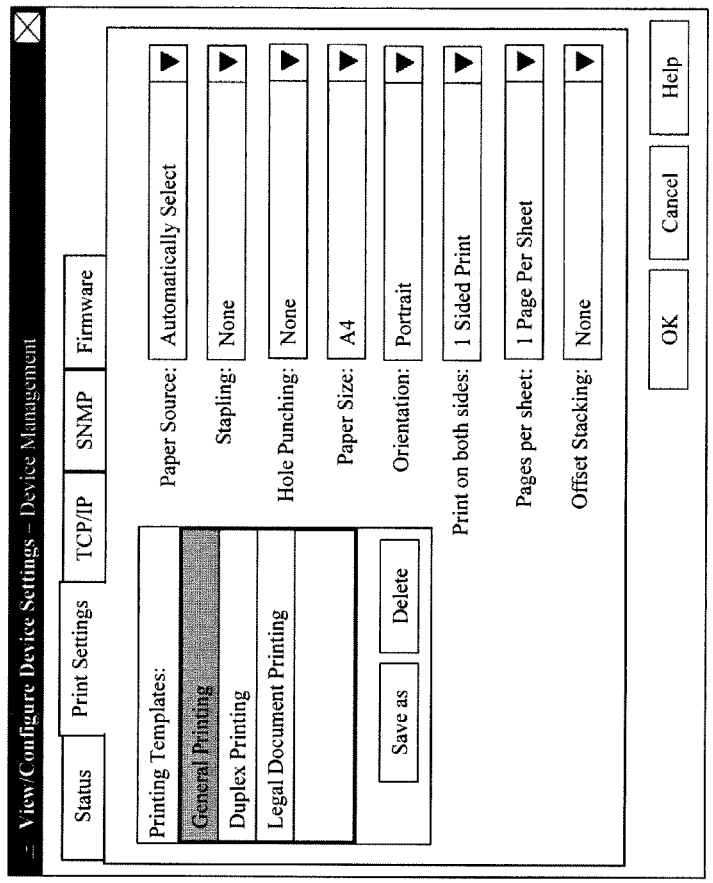
FIG. 8G shows a sample screenshot of a user interface displayed to the user, according to an exemplary embodiment.

When the user selects one of the devices listed in the device list view (e.g. the two devices shown in FIG. 8F) and activates the "view/configure settings" button located at the top of the screen, the user interface for viewing and configuring settings for the selected device is displayed to the user, for example, as illustrated in FIG. 8G. In the example of FIG. 8G, the user interface includes a plurality of selectable tabs at the top, and each tab represents a category of device settings that can be configured by the user (e.g. "status" for viewing the various status items of the device, "print settings" for viewing and configuring the print settings of the device, "TCP/IP" for viewing and configuring the TCP/IP settings of the device, "SNMP" for viewing and configuring the SNMP settings of the device, and "firmware" for viewing and configuring the firmware settings of the device). In FIG. 8G, the "print settings" tab is selected, which provides numerous printing templates and parameters that can be configured by the user.

With reference to FIGS. 9A-9I, the user interface for creating a new filter is described.

As discussed above, the filter creation part 101c-1b allows the user to select one or more filter blocks, each of which including one or more status condition options that can be selected by the user to be included in a particular power filter. Such particular power filter can be utilized by the user to limit the devices for which status information is displayed by the status information display part 101c-1a, as discussed above with reference to FIGS. 8A-8E.

Figure 9A:
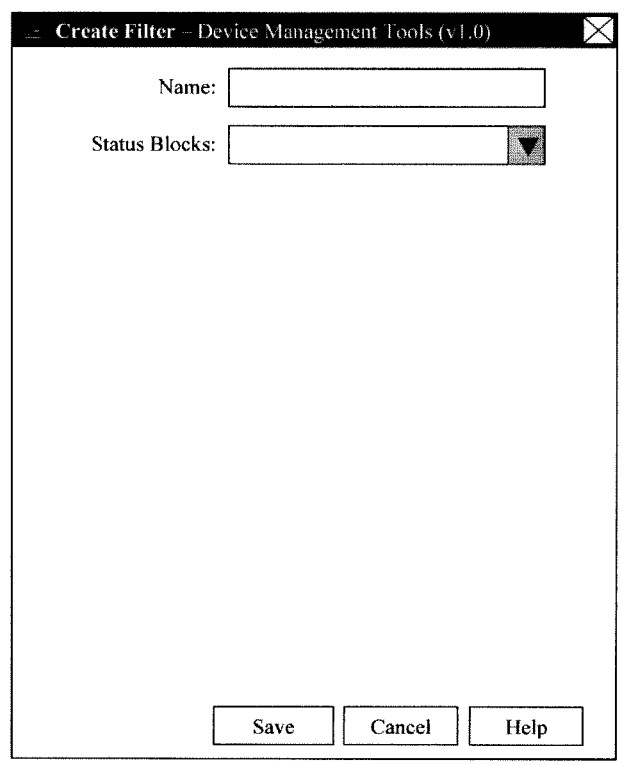
FIG. 9A shows a sample screenshot of a user interface displayed to the user, according to an exemplary embodiment.
Figure 9B:
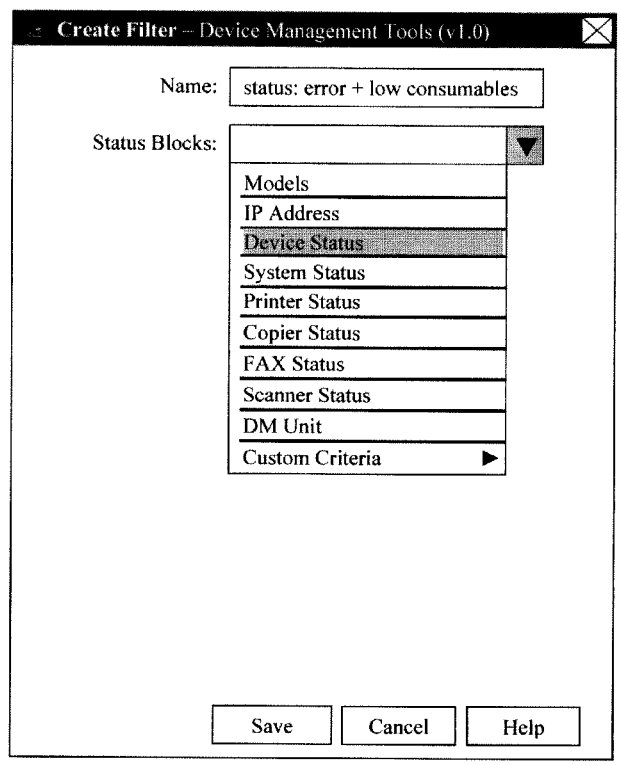
FIG. 9B shows a sample screenshot of a user interface displayed to the user, according to an exemplary embodiment.

For example, FIG. 9A shows a screenshot of the user interface (e.g. the filter creation part 101c-1b) displayed upon activating the "add filter" button shown in FIGS. 8A-8E. As shown in FIG. 9B, the user interface for creating a new power filter allows the user to specify the name of the new power filter (e.g. "status: error+low consumables"). In addition, the user interface for creating a new power filter allows the user to choose from plural status blocks (e.g. "models", "IP address", "device status", "system status", "printer status", "copier status", "FAX status", "scanner status", "DM (Device Management) unit" and "custom criteria" shown in a drop-down menu), as shown in FIG. 9B. The custom criteria, for example, allows the user to specify multiple field criteria and use "AND" and "OR" operators to combine the specified field criteria into a filter block (e.g. "device_make=Company_A AND device_status=on").

Figure 9C:
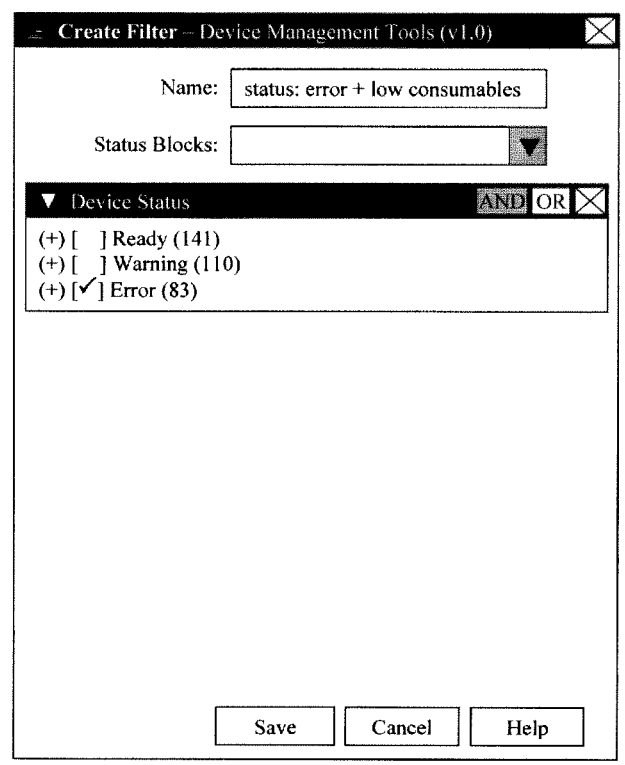
FIG. 9C shows a sample screenshot of a user interface displayed to the user, according to an exemplary embodiment.

When the user selects the "device status" status block from the drop-down menu, a new filter block corresponding to the selected "device status" status block is added to the screen, as shown in FIG. 9C. As shown in FIG. 9C, the "device status" filter block includes a plurality of status condition options (e.g. "ready", "warning" and "error", which may be expanded to display further status condition options), and the user may select (e.g. indicated by the checkmark in FIG. 9C) one or more of the plurality of status condition options to include the selected status condition options in the new power filter, such that when the new power filter is selected, only the devices satisfying the selected status condition options are displayed in the device list view (e.g. by the status information display part 101c-1a). Each status condition option includes a device count indicating the number of devices matching the status condition option amongst the plurality of devices in the network environment including the aforementioned block. In the example of FIG. 9C, the network environment has 141 devices having the device status "ready", 110 devices having the device status "warning", and 83 devices having the device status "error".

The filter block shown in FIG. 9C further includes buttons "AND", "OR" and "X". When the "AND" button is selected, the particular filter block is joined with other filter blocks using the AND logic. In other words, any status condition options selected within the particular filter block (e.g. "error" in FIG. 9C) have to be satisfied on top of the status condition options specified in the other filter blocks. On the other hand, when the "OR" button is selected, the particular filter block is joined with other filter blocks using the OR logic, meaning that any device satisfying the status condition options specified in the particular filter is included regardless of whether the device satisfies the status condition options specified in the other filter blocks. In the example of FIG. 9C, the "AND" button is selected by default, but the user may click on the "OR" button to use the OR logic to combine the particular filter block. The "X" button can be activated to remove the filter block.

Figure 9D:
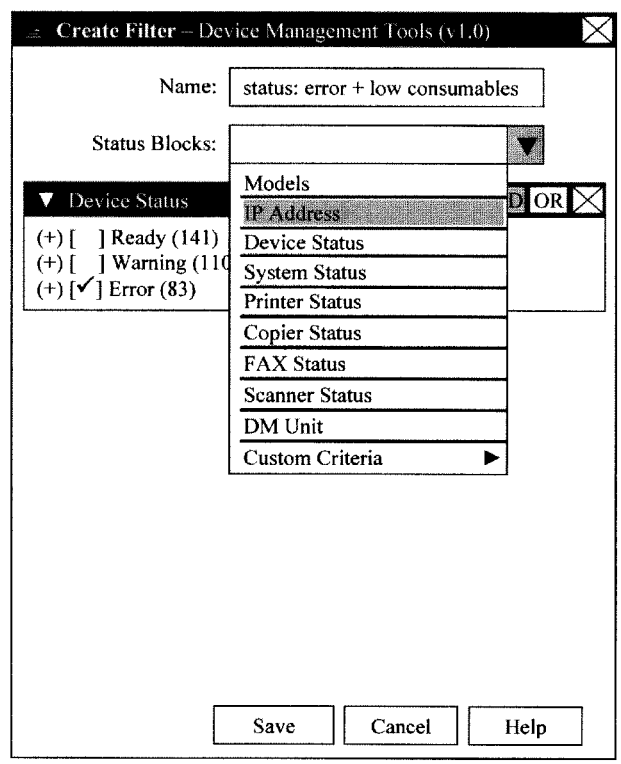
FIG. 9D shows a sample screenshot of a user interface displayed to the user, according to an exemplary embodiment.
Figure 9E:
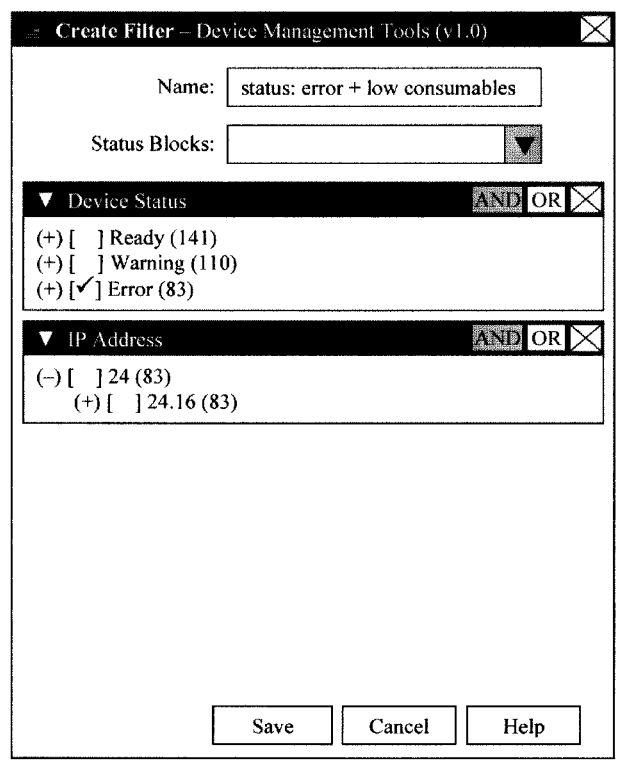
FIG. 9E shows a sample screenshot of a user interface displayed to the user, according to an exemplary embodiment.
Figure 9F:
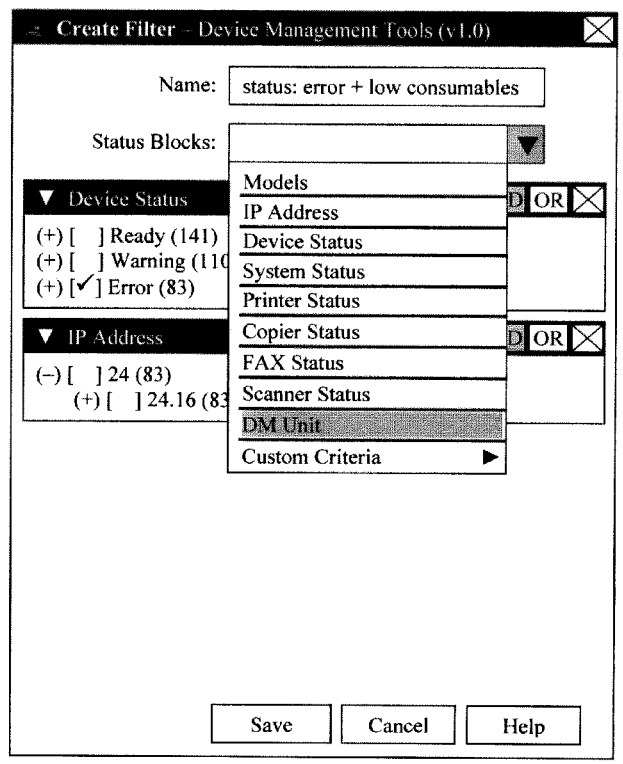
FIG. 9F shows a sample screenshot of a user interface displayed to the user, according to an exemplary embodiment.
Figure 9G:
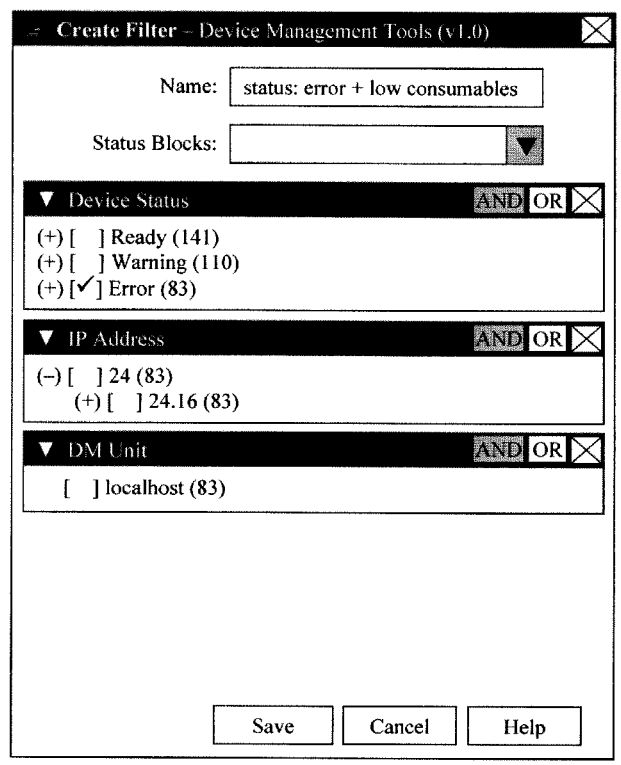
FIG. 9G shows a sample screenshot of a user interface displayed to the user, according to an exemplary embodiment.

Further, additional status blocks may be selected to add more filter blocks for the new power filter. For example, when the "IP Address" status block is selected as shown in FIG. 9D, the corresponding "IP Address" filter block is added to the new power filter, as shown in FIG. 9E. Similarly, the "IP Address" filter block also includes one or more status condition options and a device count for each status condition option. FIGS. 9F and 9G illustrate another filter block (i.e. "DM unit") being added to the new power filter.

Figure 9H:
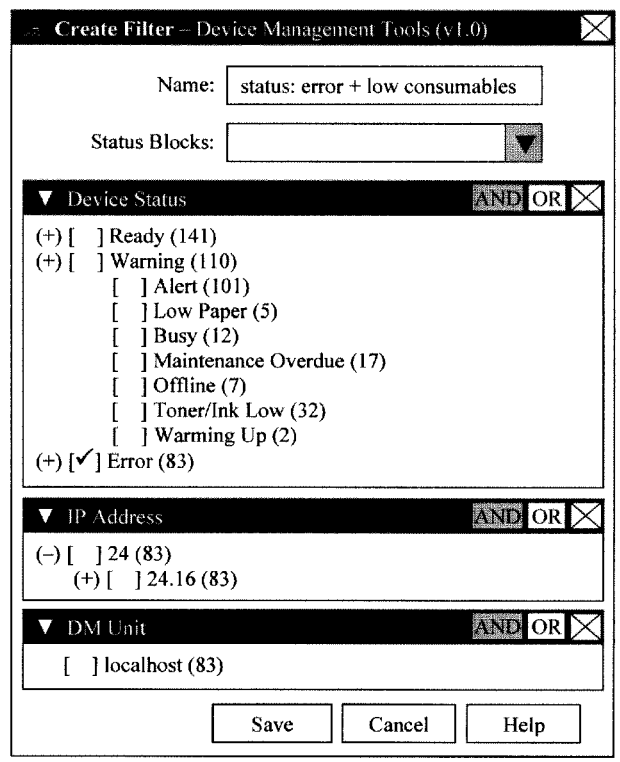
FIG. 9H shows a sample screenshot of a user interface displayed to the user, according to an exemplary embodiment.

As discussed above, a status condition option may be expanded to reveal further status condition option(s) listed thereunder (e.g. in cascade levels, with additional levels being presented upon activating the (+) icon). In the example of FIG. 9H, the "warning" status condition option in the "device status" filter block is expanded to reveal the status condition options "alert", "low paper", "busy", "maintenance overdue", "offline", "toner/ink low" and "warming up". Each of the status condition options may be additionally selected to broaden the scope of the new power filter (i.e. add to the types of devices covered by the new power filter). For example, the power filter of FIG. 9H would cause the status information display part 101c-1a to display only those devices having a device status of "error". On the other hand, the power filter of FIG. 9I would cause the status information display part 101c-1a to also display the device having a device status of "low paper" or "toner/ink low" in addition to the devices having a device status of "error".

Figure 9I:
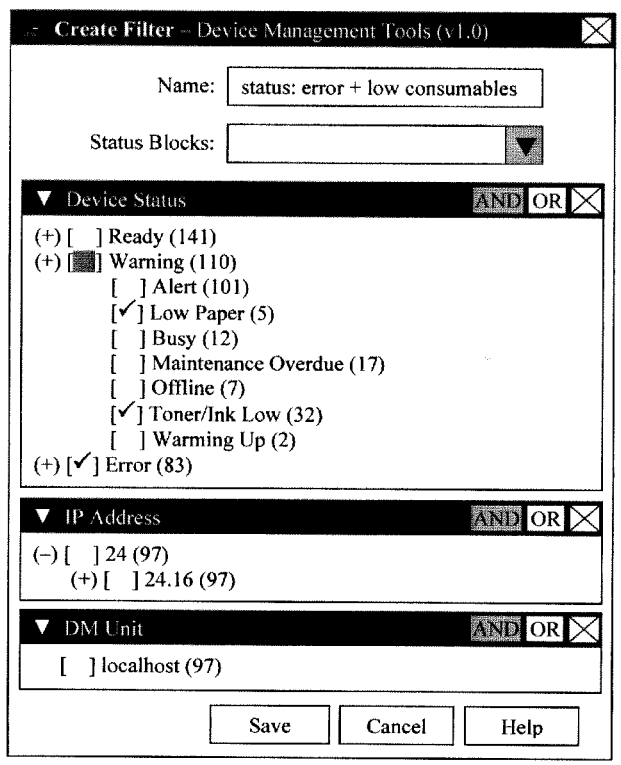
FIG. 9I shows a sample screenshot of a user interface displayed to the user, according to an exemplary embodiment.
Figure 10A:
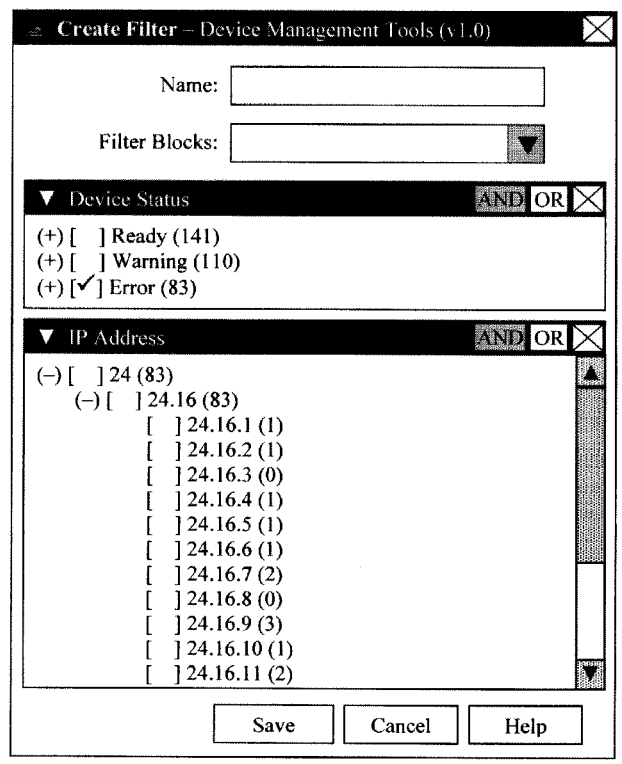
FIG. 10A shows a sample screenshot of a user interface displayed to the user, according to an exemplary embodiment.
Figure 10B:
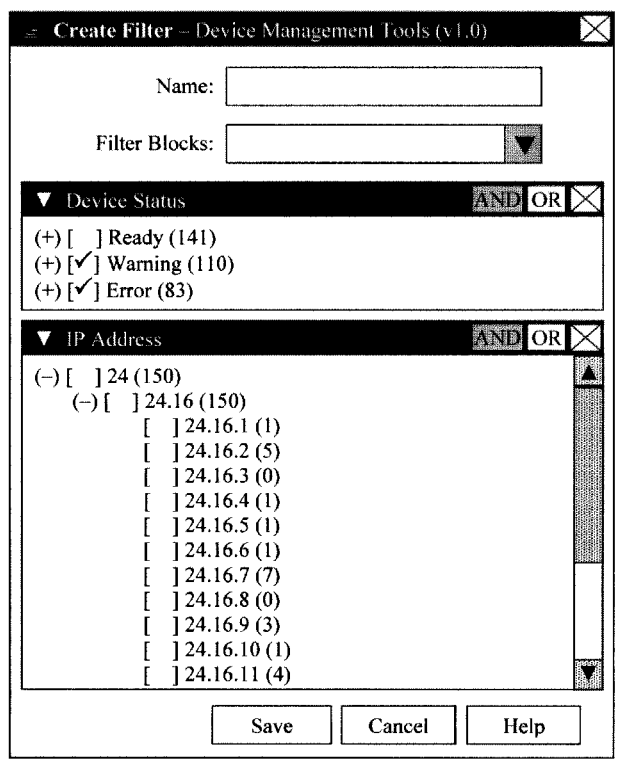
FIG. 10B shows a sample screenshot of a user interface displayed to the user, according to an exemplary embodiment.
Figure 10C:
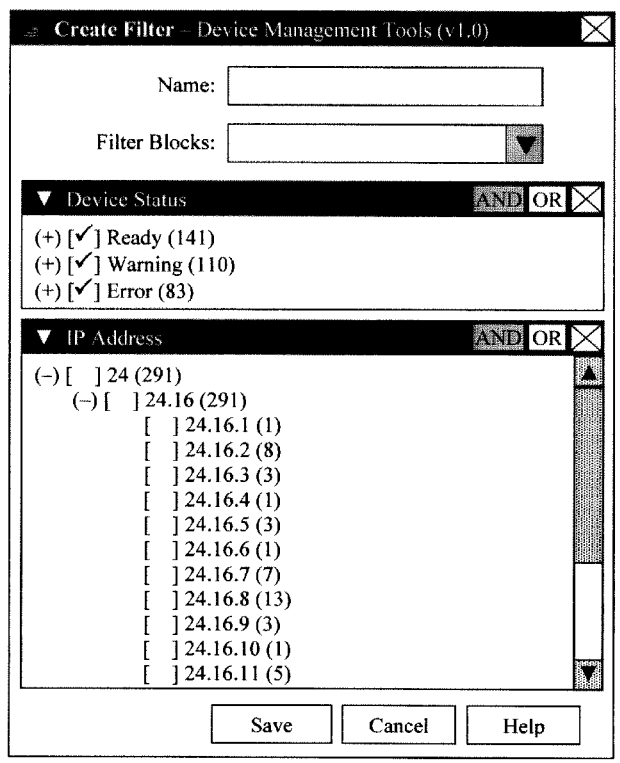
FIG. 10C shows a sample screenshot of a user interface displayed to the user, according to an exemplary embodiment.

In addition, as additional status condition options are selected by the user, the device count for each status condition option is dynamically updated. For example, when the user selects the status condition options "low paper" and "toner/ink low" from the user interface of FIG. 9H, the device counts shown in the "IP Address" filter block and the "DM unit" filter block both increase from 83 to 97, as shown in FIG. 9I. As another example, FIGS. 10A-10C illustrate the device counts being dynamically updated as additional status condition options are selected by the user.

On the other hand, if additional status condition options are selected in a new filter block (i.e. a filter block for which none of the status condition option(s) has been selected), the device count may decrease since such additional status condition options place additional restrictions on the device for which the status information may be displayed. For example, as shown in FIG. 9J, the additional selection of the "24.16.71" status condition option in the "IP Address" filter block decreases the device counts displayed in the filter blocks "device status" and "DM unit", since the user selection of the "24.16.71" status condition option has effectively excluded the devices whose IP addresses begin with "24.16.11".

Figure 9J:
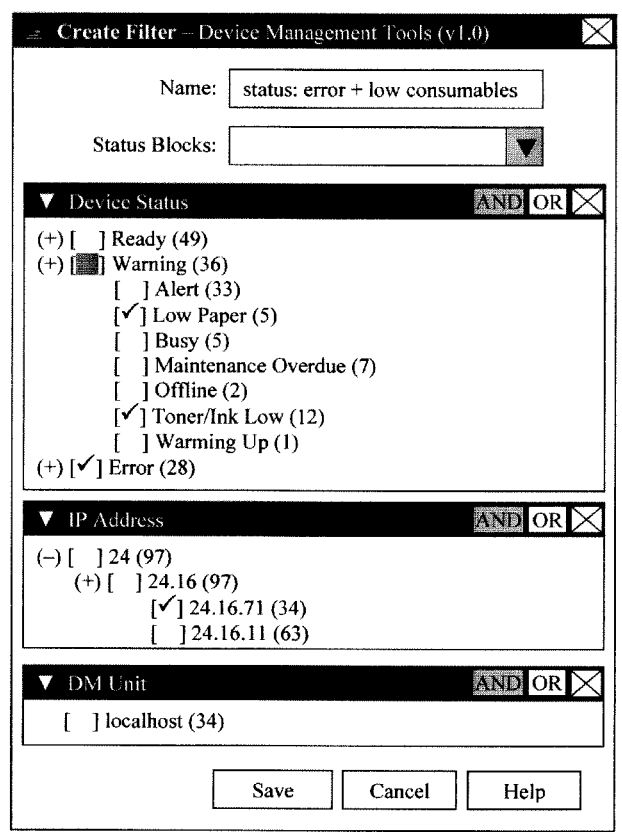
FIG. 9J shows a sample screenshot of a user interface displayed to the user, according to an exemplary embodiment.
Figure 9K:
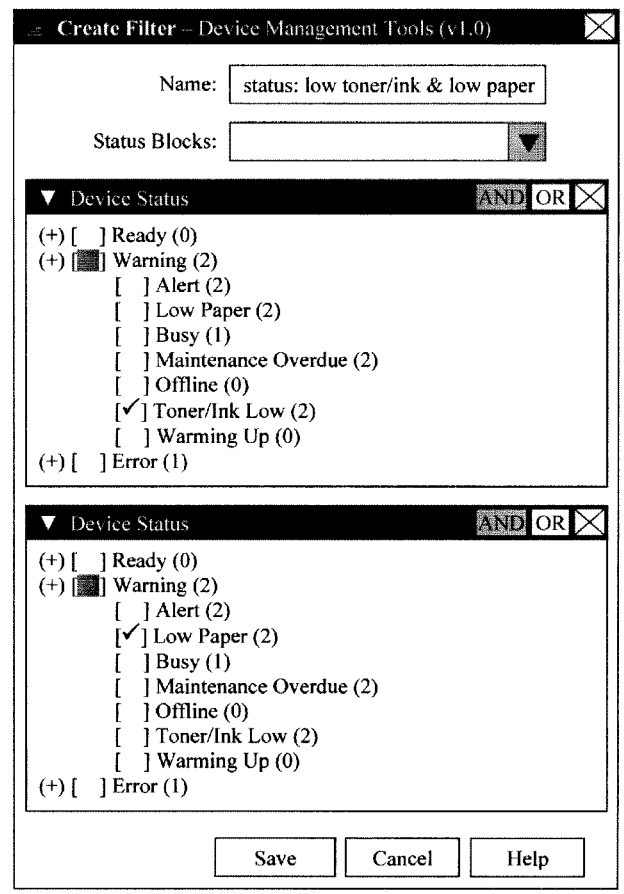
FIG. 9K shows a sample screenshot of a user interface displayed to the user, according to an exemplary embodiment.

Although the status condition options within a single filter block are joined by the OR logic in the examples illustrated in FIGS. 9I and 9J (e.g. "low paper" OR "toner/ink low"), two or more of the same filter blocks may be added to join individual status condition options within a single filter block with the AND logic, as shown in FIG. 9K. The example of FIG. 9K shows two "device status" filter blocks, each one having a different status condition option selected ("toner/ink low" and "low paper", respectively). Such a configuration indicates a filter for displaying the device status of all the device having a warning of "toner/ink low" AND a warning of "low paper". As indicated by the device count, two (2) devices in the network environment meet such condition, neither (0) of the two devices having a "ready" status, and one (1) of the two devices also having an "error" status.

Figure 11A:
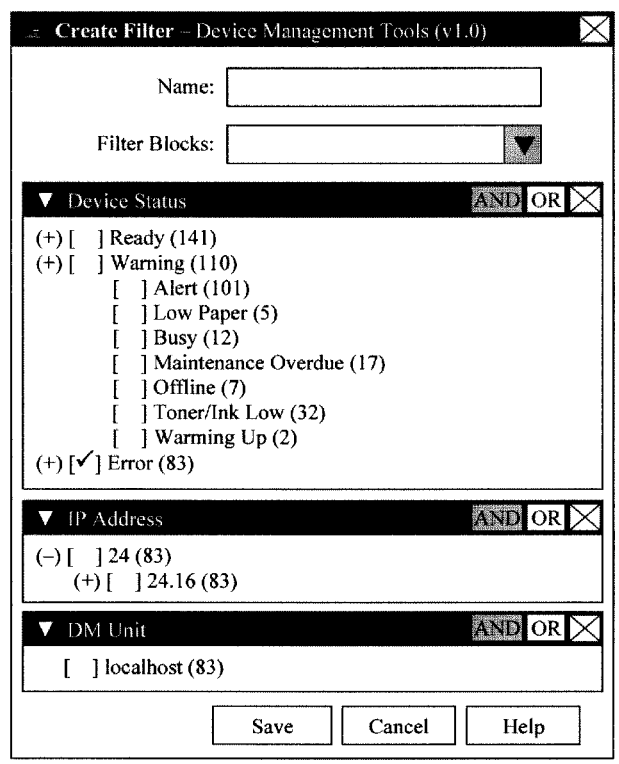
FIG. 11A shows a sample screenshot of a user interface displayed to the user, according to an exemplary embodiment.
Figure 11B:
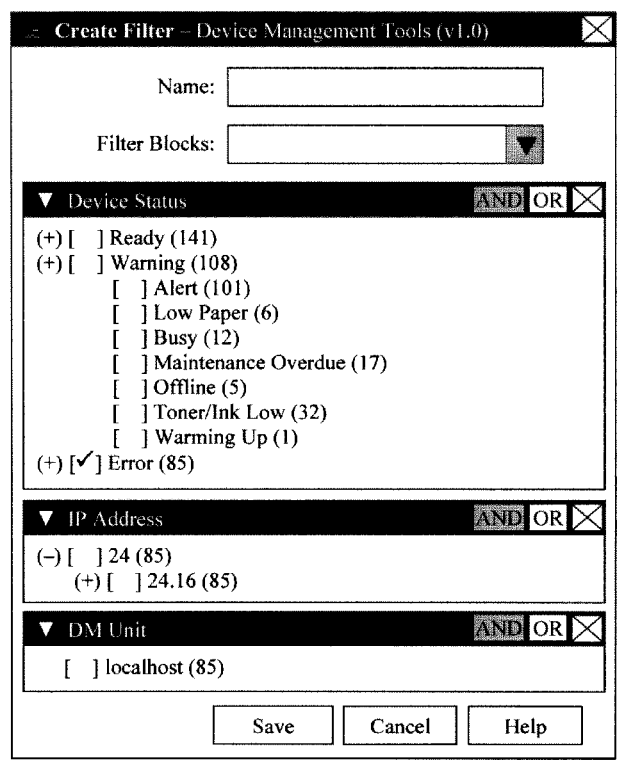
FIG. 11B shows a sample screenshot of a user interface displayed to the user, according to an exemplary embodiment.

Further, the device counts may also be updated as the device status of one or more devices in the network environment is changed. For example, the device status acquiring unit 101a may receive updated device status information by repeatedly transmitting requests to the devices in the network environment (e.g. devices 103-105) via the network 109, inquiring as to the status of each device. Alternatively, each device in the network environment may automatically transmit status updates to the device status acquiring unit 101a (without waiting for requests or queries from the device status acquiring unit 101a), at regular intervals or whenever the device status of the device is changed. The device counts are updated based on the updated device status information received by the device status acquiring unit 101a. For example, in the example illustrated in FIGS. 11A and 11B, without any user action, the device count for the "warning" status condition option has been decreased from 110 to 108, the device count for the "error" status condition option has been increased from 83 to 85, and the device count for the status condition options in the filter blocks "IP Address" and "DM unit" have been increased from 83 to 85, due to the change in the device statuses of the devices in the network environment.

Figure 12:
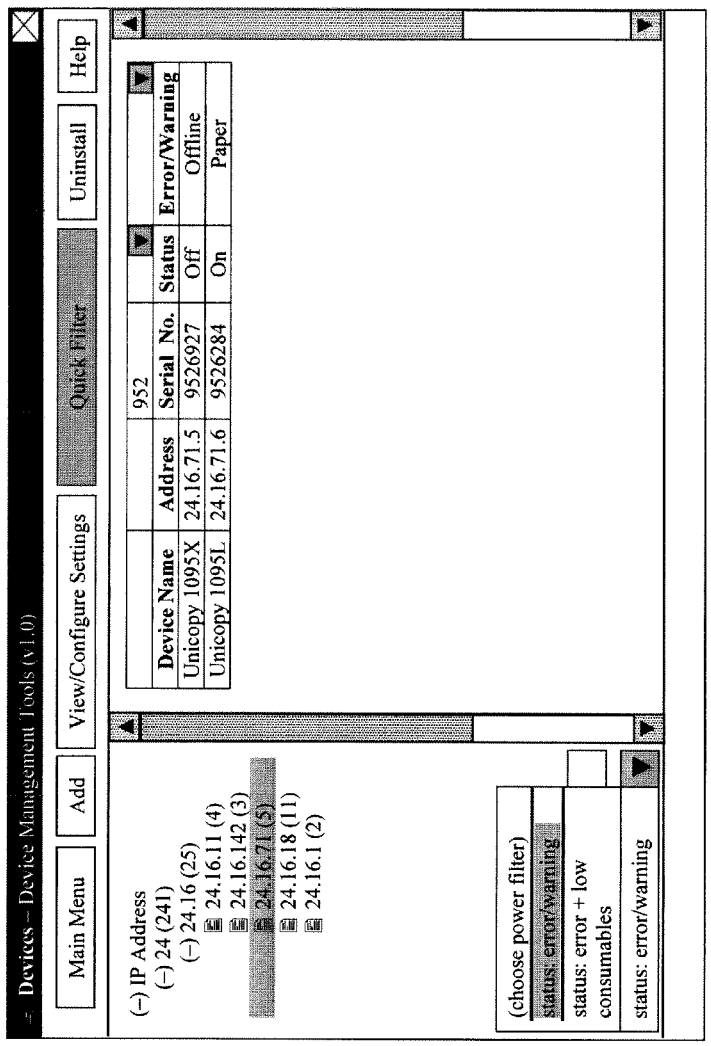
FIG. 12 shows a sample screenshot of a user interface displayed to the user, according to an exemplary embodiment.

When the user saves the new power filter, for example, by activating the "save" button shown in FIGS. 9A-9J, the new power filter ("status: error+low consumables") is added to the drop-down menu (i.e. registered) for user selection, as shown in FIG. 12.

The power filter registered by the device management apparatus is preferably accessible by the user from any location within the network environment. For example, the power filter created by a user on his work desktop may later be utilized by the user on his mobile device, as long as the mobile device is connected to the network. Further, such power filters may be shared with other users in the network environment, and can be modified to create new power filters.

In an exemplary embodiment, upon registering the new power filter, the device management apparatus may obtain the device status of the devices in the network environment and determine the particular device that match the selected status condition options included in the new power filter, for example, to facilitate the immediate use of the power filter by the user.

Referring back to FIG. 1, the storage 102 may store, for example, device data (FIG. 5A), device settings information (FIG. 5B), device capabilities information collected from the devices 103-105, access privileges of various security roles, system access activities information, security role information, user profiles of various users in the network environment, and any other data or files needed for the operation of the device management unit 101.

The network-connected devices 103-105 may include, for example, a printer, a scanner and/or a multi-function device (MFD). While this example of this disclosure simply refers to network-connected devices 103-105 in the interest of brevity, the aspects of this disclosure are applicable to a network environment having an arbitrary number of devices.

The network 109 can be a local area network, a wide area network or any type of network such as an intranet, an extranet (for example, to provide controlled access to external users, for example through the Internet), the Internet, etc., or a combination thereof. Further, other communications links (such as a virtual private network, a wireless link, etc.) may be used as well for the network 109. In addition, the network 109 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 2:
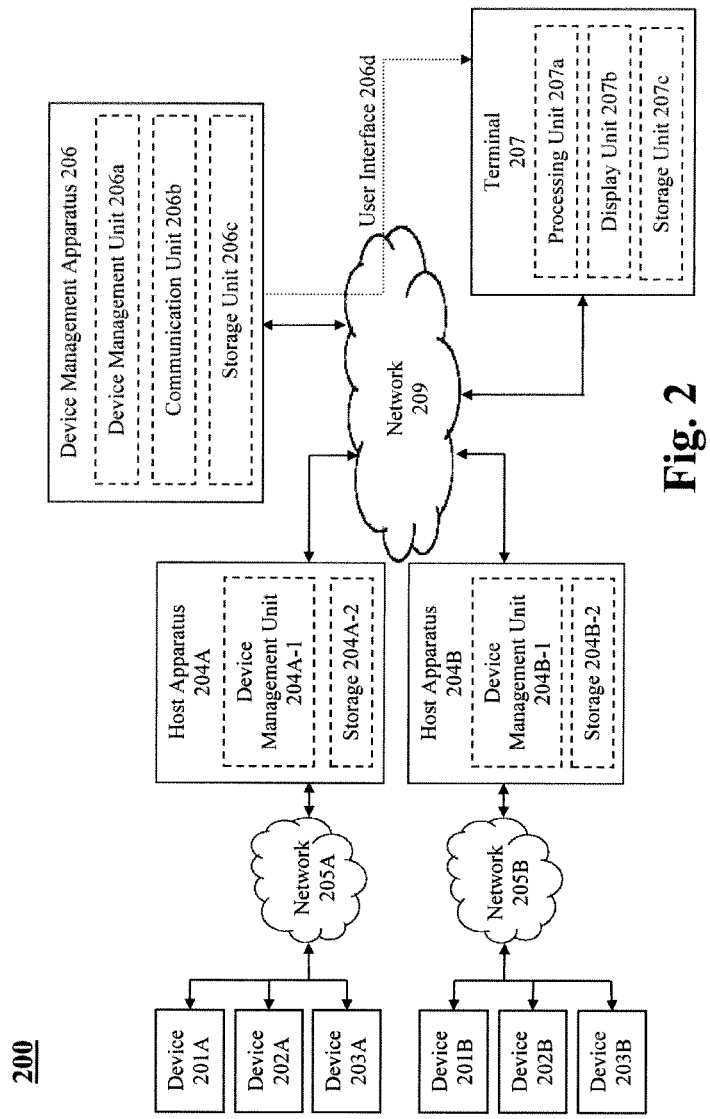
FIG. 2 shows a block diagram of a system for managing a plurality of network-connected devices, according to another exemplary embodiment.

FIG. 2 shows schematically a system 200 for managing a plurality of devices connected to a network, according to an exemplary embodiment. The system 200 includes devices (i.e. network-connected devices) 201A-203A and a device management (DM) unit 204A-1 installed on a host apparatus 204A including a storage 204A-2, all of which are interconnected by a network 205A ("Network A"); devices 201B-203B and a device management unit 204B-1 installed on a host apparatus 204B including a storage 204B-2, all of which are interconnected by a network 205B ("Network B"); a device management apparatus 206 and a terminal 207, both of which are interconnected by a network 209 ("Network C"). The host apparatuses 204A and 204B are also connected to the network 209.

The devices 201A-203A and 201B-203B may include, for example, a printer, a scanner, a terminal and/or a multi-function device (MFD). While this example of this disclosure simply refers to devices 201A-203A and 201B-203B in the interest of brevity, the aspects of this disclosure are applicable to a network environment having an arbitrary number of devices. An exemplary configuration a network device as an MFD is described infra with reference to FIG. 6C.

The device management units 204A-1 and 204B-1, each of which are implemented on the corresponding host apparatus, are configured to manage and collect device data from the devices in the system 200. In particular, each of the device management units may be responsible for managing and collecting data from a subset of the devices in the system 200. For example, as shown in FIG. 2, the device management unit 204A-1 manages and collects device data from the devices 201A-203A, and the device management unit 204B-1 manages and collects device data from the devices 201B-203B. The device data collected by the device management units 204A-1 and 204B-1 may respectively be stored in internal storage units therein (e.g. storage units 204A-2 and 204B-2), external storage units connected thereto, or storage units accessible via the networks 205A and 205B. The device management unit 206a may access all of the devices 201-203 and the storage units 204A-2 and 204B-2 to retrieve data stored therein.

Figure 3:
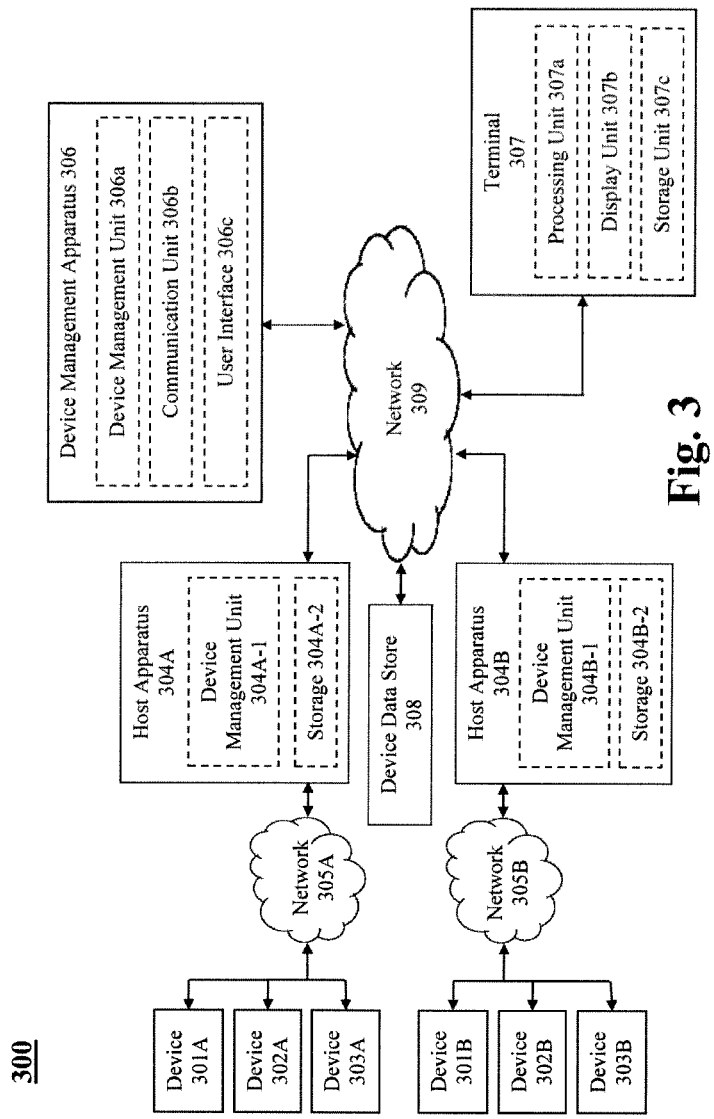
FIG. 3 shows a block diagram of a system for managing a plurality of network-connected devices, according to another exemplary embodiment.

For example, FIG. 3 shows a system 300 which includes a device data store 308 connected to a network 309. The device data store 308 may store any information or data collected by the device management units 304A-1, 304B-1 and 306a, and can be accessed via the network 309 by the host apparatuses 304, the device management unit 306 and the terminal 307, as needed.

Also, in the example of FIG. 3, the user interface 306c is provided in the device management apparatus 306, instead of being provided to the terminal 307.

Otherwise, operations of the elements of the system 300 are similar to those discussed in connection with the corresponding elements of the system 200 of FIG. 2.

Referring back to FIG. 2, an example of device data collected by the device management units 204A-1 and 204B-1 from the devices 201A-203A and 201B-203B is illustrated in FIG. 5A. As seen in FIG. 5A, the device data for each device may include a variety of attributes such as name, manufacturer, IP address, device age, status, firmware version and department. The information depicted in FIG. 5A is merely exemplary, and other network devices, device status information, device properties, device configuration information, and so forth, may be included in the device data collected by the data management units. As non-limiting examples, the device data may include one or more of the following for a given network device: device manufacturer; device model; device serial number; device type (printer, scanner, terminal, etc.); device location (physical address, geographic address, network address, IP address, MAC address, etc.); output technology (e.g., laser, inkjet solid ink, thermal, other technology, etc.); device location type (e.g., production/copy center, in a specific workgroup area, etc.); scope (e.g., within the scope of administrative responsibility of a particular IT administrator, outside the scope of administrative responsibility of particular IT administrator, etc.); connection type (e.g., network connected, workstation/local connected, non-connected, etc.); device age (e.g., <1 year, 1-2 years, 2-3 years, 3-4 years, 4-5 years, >5 years, etc.); functions (e.g., copy, fax, print, scan, copy/scan, copy/fax, copy/print, print/fax, print/scan, copy/print/fax, copy/print/scan, copy/print/fax/scan, etc.); firmware version (e.g., major version, minor version, etc.); installed applications (e.g., application name, major version, etc.); organization (e.g., different groups, sub-groups, levels, departments, divisions and so forth within a larger enterprise or institutional entity, such as management group, sales group, marketing group, research & development group, etc.); supply level (e.g., consumable types such as paper and toner>empty/low/ok, etc.); capability (e.g., color, economy color, monochrome only, color scan, duplex, A3, not A3, etc.); last status update (e.g., 10 minutes, 60 minutes, 6 hours, etc.); duplex usage (e.g., 2:1, 1:2, 2:2, Book Duplex, etc.); paper size usage (e.g., A3, A4, B4, etc.); pages per job (e.g., 1, 2, 6-10, etc.); pages per minute (PPM) range (e.g., 1-20 ppm, 41+ ppm, etc.); color technology (e.g., professional color, convenience color, etc.); audit results/analysis (e.g., devices which satisfied a particular audit or test, devices which did not satisfy a particular audit or test, etc.); and so forth.

The device data collected by the device management units 204A-1 and 204B-1 may also include error history information that includes a log of all errors occurring at the corresponding managed device, and usage history information indicating which users have the utilized the managed device and when such use has occurred. The usage history information may indicate, for example, a number of total impressions (e.g. pages) produced by a user, or a number of specific types of impressions (copy color, copy BW, print color, print BW, etc.) produced by a user.

The device management units 204A-1 and 204B-1 communicate with one or more of the plurality of network-connected devices to collect and obtain the various device data corresponding to each device. Many printers and other devices store data indicating their attributes or properties in a Management Information Base (MIB). The MIB may conform with the SNMP (Simple Network Management Protocol) protocol, and properties information can be obtained directly from the MIB through SNMP queries. In this way, the device management units 204A-1 and 204B-1 are configured to discover and/or poll the corresponding plurality of network devices to obtain the device data from the network devices.

The device management units 204A-1 and 204B-1 may obtain the device data (such as the name, status, configuration information, error history, usage history, etc.) from each network device by monitoring a network to which the device is connected (i.e. networks 205), and detecting and receiving one or more alert notifications or status updates transmitted to the network from any of the plurality of network-connected devices 201-203. For example, the device management units 204A-1 and 204B-1 may receive the status updates by repeatedly transmitting requests to the network-connected devices 201-203 via the networks 205, inquiring as to the status of each network device. In response, each network device may transmit status updates back to the corresponding device management unit, wherein each status update indicates the device name, status, configuration information, error history, usage history, whether an error exists or has occurred at the network device, etc. Alternatively, each network-connected device may automatically transmit status updates to the corresponding device management unit (without waiting for requests or queries from the device management unit), at regular intervals or whenever an error occurs at the network-connected device. The device management units 204A-1 and 204B-1 may include locally resident hardware and/or software agents installed locally on each of the devices 201-203, which are configured to transmit the status updates directly to the corresponding device management unit.

As discussed above, the device data may be stored along with other data in one or more storage units external to the device management units 204A-1 and 204B-1, or alternatively, in one or more storage units (e.g. 204A-2 and 204B-2) resident in the device management units 204A-1 and 204B-1 and retrieved as needed.

The device management units 204A-1 and 204B-1 may also collect device settings information from the devices 201-203. Such device settings information according to an exemplary embodiment is shown in FIG. 5B. As seen in FIG. 5B, the device settings information for each network-connected device may include a variety of attributes such as setting name, setting type, default value of the setting, and the options selectable for the setting. The information depicted in FIG. 5B is merely exemplary, and a wide range of other device preference settings, such as network settings, authentication settings, log settings, image settings, print settings and etc., may be included in the device settings information collected by the data settings management units. As non-limiting examples, "device group" indicating the group to which the particular network-connected device belongs in a network environment, "SNMPv3" indicating whether SNMPv3 (Simple Network Management Protocol, version 3) is enabled, "reception protocol" indicating a protocol used for e-mail reception, "memory overflow" indicating an action to perform in the event of a memory overflow (e.g. do not print), "toner saving" indicating whether a toner saving mode is enabled, "firmware update" indicating whether firmware update is permitted, and so forth.

In a similar manner, the device management units 204A-1 and 204B-1 may collect and store other information such as device capabilities information which indicates the various tasks that can be performed by the devices in the network environment, system access activities information indicating details of activities performed by various users in the network environment, security role information indicating various roles and corresponding access privileges assigned to the users in the network environment.

Such information (e.g. such as shown in FIGS. 5A and 5B) collected and/or maintained by the device management units 204A-1 and 204B-1 and/or the device management apparatus 206 can be stored in internal storage units resident in the host apparatuses 204 (e.g. storage units 204A-2 and 204B-2) and/or the device management apparatus 206. Alternatively, the information can be stored in a storage unit connected to the host apparatuses 204, the device management apparatus 206 and/or the terminal 207, or in a storage unit accessible via the network 209, and retrieved as needed. For example, the information may be stored in one or more databases [e.g. off-the-shelf database applications based on SQL (Structured Query Language), or other customized database applications with search/query function]. If the information is stored in more than one location, the information may be synced, for example, periodically or upon a user request.

Referring back to FIG. 2, the networks 205A and 205B may, for example, each represent an intranet for a particular office of an enterprise, which has an enterprise network (e.g. network 209) connecting each of the intranets.

Although the networks 205A, 205B and 209 are illustrated as being separate networks, the system 200 is not limited to such configuration, and any of the networks shown in FIG. 2 may be combined and/or separated, and the system 200 may include any arbitrary number of networks.

As shown in FIG. 2, the device management apparatus 206 includes a device management unit 206a, a communication unit 206b and a storage unit 206c. The device management unit 206a performs functions similar to those performed by the device status acquiring unit 101a and the status user interface unit 101b of FIG. 1.

The communication unit 206b allows the device management apparatus 206 to communicate through the network 209, such as with the device management units 204A-1 and 204B-1 and the terminal 207.

The communication unit 206b may be configured to communicate with any particular device amongst plural heterogeneous devices that may be included in the system 200 in a communication format native to the particular device. For example, in the system 200, the communication unit 206b may be configured to communicate with each of the devices 201-203 (including any other device management units, terminals and/or other devices that may be connected to the network 209) in a communication format established by the respective manufacturers/vendors of such devices. The communication unit 206b may determine an appropriate communication format native to the particular device by any of various known approaches. For example, the communication unit 206b may refer to a database or table, maintained internally or by an outside source, to determine an appropriate communication format native to the device. As another example, the communication unit 206b may access an Application Program Interface (API) of the particular device, in order to determine an appropriate communication format native to the device.

The storage unit 206c may store any device data or device status information collected by the device management units 204A-1, 204B-1 or 206a. In addition, the storage unit 206c may also store power filters created by the user. Such power filters stored in the storage unit 206c may be accessed from any location in the network environment, via the network 209. The power filters created by a particular user may also be shared by other users in the network environment, via the network 209.

As shown in FIG. 2, the device management apparatus 206 provides a user interface 206d to the terminal 207. For example, the device management apparatus 206 may provide the terminal 207 with an application for providing a thin client constituted by the user interface 206d, wherein the device management apparatus 206 performs the bulk of the processing. On the other hand, the device management apparatus 206 may transmit an application to the terminal 207, and the application stored on the terminal 207 may be executed by the terminal 207 to display the user interface 206d. The user interface 206d is similar to that discussed supra in connection with FIG. 1.

The terminal 207 includes a processing unit 207a, a display unit 207b and a storage unit 207c. For example, the device management unit 206a causes the processing unit 207a to execute a device management application (e.g. stored in the storage unit 207c), which causes the display unit 207b to display the user interface 206d. The user at the terminal 207 (e.g. an administrator of the network environment managed and monitored by the device management apparatus 206) can manage the plurality of devices assigned to the device management apparatus 206, via the user interface 206d.

The storage unit 207c may also store any information (e.g. device data, device settings information, etc.) received from the devices 201-203, the host apparatuses 204 and the device management apparatus 206. The terminal 207 is further described infra with reference to FIG. 6B.

Each of the network connections 205 and 209 can include one or more connections via a secure intranet or extranet, a local area network (LAN), a wide area network (WAN) or any type of network such as an intranet, an extranet (for example, to provide controlled access to external users, for example through the Internet), the Internet, etc., or a combination thereof. Further, other communications links (such as a virtual private network, a wireless link, etc.) may be used as well for the networks 205 and 209. In addition, the networks 205 and 209 preferably use TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference. Although the devices 201-203 depicted in FIG. 2 are shown as being connected to one or more networks, the aspects of this disclosure may be applied to a system for managing a device that is not connected to a network but utilizes instead point-to-point communication, such as radio-frequency identification (RFID) technology. Such technology is well-known in the art and a description thereof is omitted in the interest of brevity.

Figure 4A:
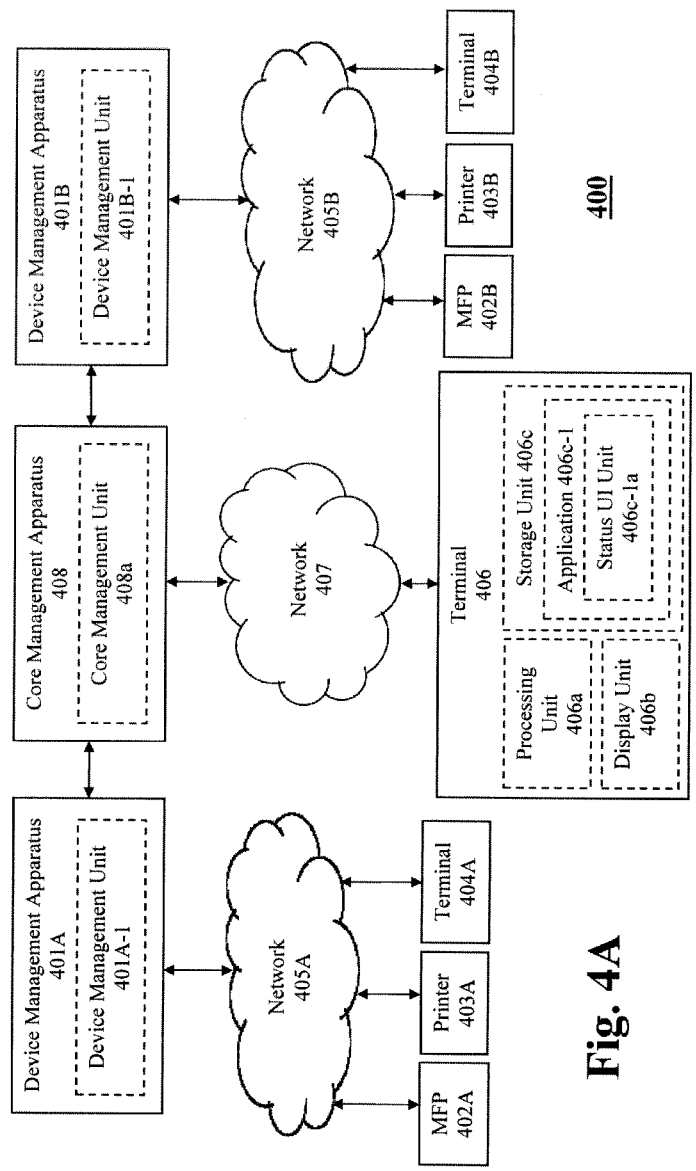
FIG. 4A shows a block diagram of a system for managing a plurality of network-connected devices, according to another exemplary embodiment.

With reference to FIG. 4A, a system for managing a plurality of devices connected to a network, according to another exemplary embodiment, is described below.

The example of FIG. 4A includes a system 400 which includes a device management apparatus 401A including a device management unit 401A-1, an MFP 402A, a printer 403A and a terminal 404A, all of which are interconnected by a network 405A (collectively "Network A"); a device management apparatus 401B including a device management unit 401B-1, an MFP 402B, a printer 403B and a terminal 404B, all of which are interconnected by a network 405B (collectively "Network B"); a terminal 406 and a core management apparatus 408 including a core device settings management unit 408a, which are interconnected by a network 407 (collectively "Network C"). The core management apparatus 408 is connected to the device settings management apparatuses 401A and 401B.

Each of terminals 404A and 404B may be a user terminal via which a user interface for managing the network-connected devices in the respective networks 405A and 405B is displayed. For example, when the user at the terminal 404A may view device data associated with the MFP 204A and the printer 403A, and modify device settings of the MFP 402A and the printer 403A.

The terminal 406 includes a processing unit 406a, a display unit 406b and a storage unit 406c. The operations of the processing unit 406a and the display unit 406b are similar to those of the processing unit 106a and the display unit 106b discussed in connection with FIG. 1, respectively. The storage unit 406c includes an application 406c-1 having a status user interface unit 406c-1a. Upon the execution of the application 406c-1 by the processing unit 406a, a user interface similar to that described with reference to FIG. 1 is displayed on the display unit 406b. The user (e.g. administrator) at the terminal 406 may access the device status of the plurality of devices in the system 400 via the user interface, in the manner described supra in connection with FIG. 1.

For example, the user at the terminal 404A may be a user at the local office of an enterprise, each of Networks A and B representing a separate office, and the user at the terminal 406 may be an administrator who is responsible for managing the entire enterprise network and authorized to remotely access the device status of the devices in multiple regional networks.

The core management unit 408a and/or the device management units 401A-1 and 401B-1 may be realized by a computer program product including a computer-usable, non-transient medium (such as a disk storage apparatus) having instructions tangibly embodied therein that are executed by a computer. Thus, it should be understood that the core management unit 408a and/or the device management units 401A-1 and 401B-1 may be executed on a computer. While the core management unit 408a and/or the device management units 401A-1 and 401B-1 are shown as being external to the network devices, the core management unit 408a and/or the device management units 401A-1 and 401B-1 may in fact be executed on a client terminal and/or a network-connected device.

The core management apparatus 408 and/or the device management apparatuses 401 may include a data store that can comprise one or more structural or functional parts that have or support a storage function. For example, the data store can be, or can be a component of, a source of electronic data, such as a document access apparatus, a backend server connected to a document access apparatus, an e-mail server, a file server, a multi-function peripheral device (MFP or MFD), a voice data server, an application server, a computer, a network apparatus, a terminal etc. It should be appreciated that the term "electronic document" or "electronic data", as used herein, in its broadest sense, can comprise any data that a user may wish to access, retrieve, review, etc.

As an example, the core management unit 408a may be used by a super administrator who is in charge of managing an entire enterprise network which may include plural regional networks. In contrast, each local administrator may be in charge of managing one of such plural regional networks via the device management units 401A-1 and 401B-1.

Otherwise, operations of the elements of the system 400 are similar to those discussed in connection with the corresponding elements of the system 100 of FIG. 1.

In the example of FIG. 4A, only three networks (Networks A-C) are shown in the interest of brevity, but the system 400 is not limited to such configuration. The core management apparatus 408 may be connected to any arbitrary number of device management apparatuses 401 and other devices (e.g. terminal 406).

Also, how the core management apparatus 408, device management apparatuses 401 and terminal 406 are connected is not limited to the configuration shown in FIG. 4A. For example, the core management apparatus may be connected to one or more device management units which are connected to one or more network devices and/or further device management units for managing other network devices. Each of the core management unit 408a and the device management units 401A-1 and 401B-1 may be implemented on a host computer, a network device (e.g. MFD), a terminal, or any other device including a processor and a non-transitory computer-readable storage medium.

Figure 4B:
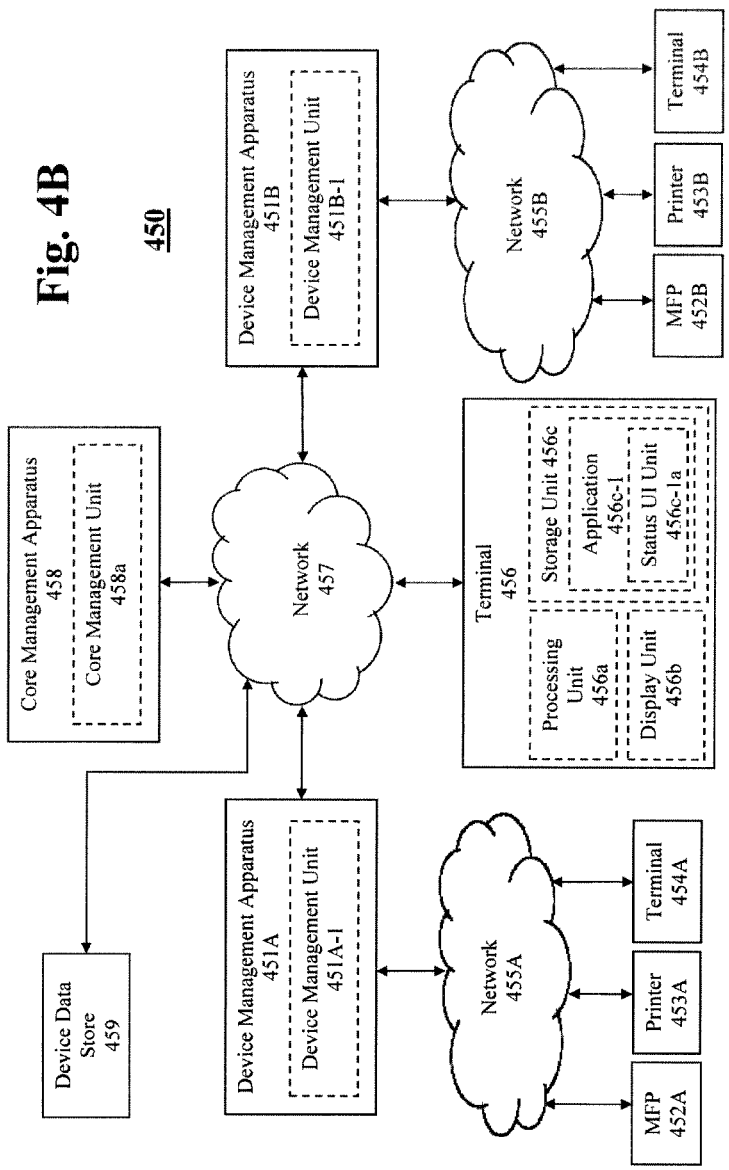
FIG. 4B shows a block diagram of a system for managing a plurality of network-connected devices, according to another exemplary embodiment.

FIG. 4B shows a system for managing a plurality of devices connected to a network, according to another exemplary embodiment.

In the example of FIG. 4B, device management apparatuses 451 are connected to a core management apparatus 458 via a network 457. Thus, instead of communicating directly to the device management apparatuses 451, the core management apparatus communicates to the device management apparatuses 451 via the network 457. Also, the terminal 455 may also communicate with the device management apparatuses 451, without having to go through the core management apparatus 458, to, for example, obtain device status information from the device management apparatuses 451.

The system 450 further includes a device data store 459 connected to the network 457. The device data store 459 may contain any information collected from the devices in the network environment and/or user profiles and corresponding power filters created by the users in the network environment, and can be accessed by any element (e.g. device management units 451A-1 and 451A-1, core management unit 458a or the terminal 455) in the system 450.

Otherwise, operations of the elements of the system 450 are similar to those discussed in connection with the corresponding elements of the system 400 of FIG. 4A.

FIG. 6A shows an exemplary configuration of a computing device that can be configured (for example, through software) to operate (at least in part) as the core management apparatus 408 of FIG. 4A and/or device management apparatuses 401 illustrated in FIG. 4A. As shown in FIG. 6A, the management unit 600 includes a controller (or central processing unit) 601 that communicates with a number of other components, including memory or storage part 602, network interface 603, display 604 and keyboard 605, by way of a system bus 609.

The management unit 600 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

In the management unit 600, the controller 601 executes program code instructions that control device operations. The controller 601, memory/storage 602, network interface 603, display 604 and keyboard 605 are conventional, and therefore in order to avoid occluding the inventive aspects of this disclosure, such conventional aspects will not be discussed in detail herein.

The management unit 600 includes the network interface 603 for communications through a network, such as communications through the network 109 with the network-connected devices 103-105 in FIG. 1. However, it should be appreciated that the subject matter of this disclosure is not limited to such configuration. For example, the management unit 600 may communicate with client terminals through direct connections and/or through a network to which some components are not connected. As another example, the management unit 600 does not need to be provided by a server that services terminals, but rather may communicate with the devices on a peer basis, or in another fashion.

The core management units and/or the device management units of the present disclosure are not limited to a server or computer, but can be manifested in any of various devices that can be configured to communicate over a network and/or the Internet.

Figure 6B:
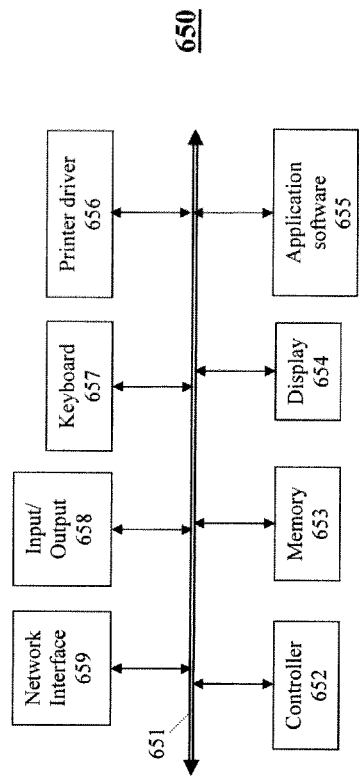
FIG. 6B shows a block diagram of an exemplary configuration of a terminal, according to an exemplary embodiment.

An example of a configuration of the terminal 106 of FIG. 1 and/or the terminals 404 of FIG. 4A (for example, as a computer) is shown schematically in FIG. 6B. In another exemplary embodiment, the terminals (e.g. terminal 106 of FIG. 1) described in the present disclosure may be configured as an MFP.

In FIG. 6B, computer 650 includes a controller (or central processing unit) 652 that communicates with a number of other components, including memory 653, display 654, keyboard (and/or keypad) 657, other input/output (such as mouse, touchpad, stylus, microphone and/or speaker with voice/speech interface and/or recognition software, etc.) 658, network interface 659, print driver 656 and application software 655, by way of an internal bus 651.

The memory 653 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 659 provides a connection (for example, by way of an Ethernet connection or other network connection which supports any desired network protocol such as, but not limited to TCP/IP, IPX, IPX/SPX, or Net-BEUI) to the network to which the computer 650 is connected (e.g. network 109 of FIG. 1).

Print driver 656 and application software 655 are shown as components connected to the internal bus 651, but in practice are typically stored in storage media such as a hard disk or portable media, and/or received through the network, and loaded into memory 653 as the need arises.

Depending on the type of the particular terminal device, one or more of the components shown in FIG. 6B may be missing. For example, a particular mobile phone may be missing the print driver 656 and the keyboard 657.

Additional aspects or components of the computer 650 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Each of the network-connected devices 103-105 of FIG. 1 (or other network-connected devices described in the present disclosure) may be any device including but not limited to a personal, notebook or workstation computer, a terminal, a kiosk, a personal digital assistant (PDA), a tablet computing device, a smartphone, a scanner, a printer, a facsimile machine, a multi-function device (MFD), a server, a mobile phone or handset, another information terminal, etc. Each network-connected device may be configured with software allowing the network-connected device to communicate through a network with a device management unit and/or a core management unit described in the present disclosure.

Figure 6C:
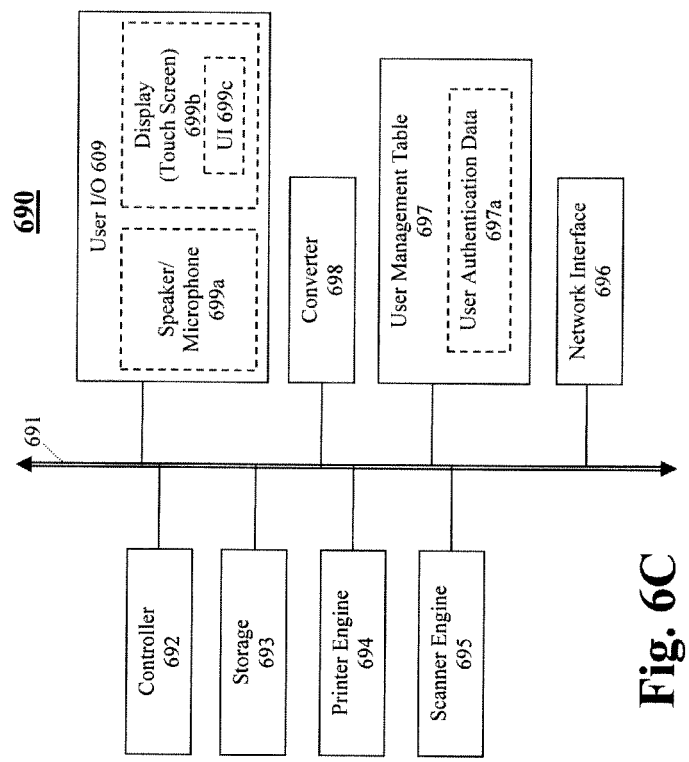
FIG. 6C shows a block diagram of an exemplary configuration of a multi-function peripheral device, according to an exemplary embodiment.

FIG. 6C shows a schematic diagram of a configuration of a network-connected device as an MFD, according to an exemplary embodiment, which can be any apparatus (including a microprocessor chip or a collection of devices having varying degree of integration) that has the ability to perform two or more functionalities.

The MFD 690 shown in FIG. 6C includes a controller 692, and various elements connected to the controller 692 by an internal bus 691. The controller 692 controls and monitors operations of the MFD 690. The elements connected to the controller 692 include storage 693 (for example, random access memory, read-only memory, hard disk drive, portable storage media drive such as for optical discs, magnetic discs, magneto-optical discs, etc., semiconductor memory cards, combinations of storage media, etc.), printer engine 694, scanner engine 695, network interface (I/F) 696, converter 698 for converting data from one format to another format (for example, a format suitable for printing, faxing, e-mailing, etc.), and user I/O (Input/Output) 699. The controller 692 also utilizes information stored in user management table 697 to authenticate the user and control user access to the functionalities of the MFD 690.

Storage 693 can include one or more storage parts or devices [e.g. a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 693 and executed by the controller 692 to carry out the instructions. Such instructions can include instructions for performing specified functions (such as printing, scanning, faxing, copying, e-mailing, etc.) of the MFD 690, to enable the MFD 690 to interact with a terminal, as well as perhaps other external devices, through the network interface 696, and to control the converter 698, access data in the user management table 697, and interactions with users through the user I/O 699.

The network interface 696 is utilized by the MFD 690 to communicate with other network-connected devices such as a terminal or a device management apparatuses (e.g., device management apparatus 101 of FIG. 1) and receive data requests, print jobs, user interfaces, and etc.

The user I/O 699 includes one or more display screens that display, under control of controller 692, information allowing the user of the MFD 690 to interact with the MFD 690. The display screen can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFD 690, so as to allow the operator to interact conveniently with services provided on the MFD 690, or with the MFD 690 serving as terminal for accessing electronic data or other content through the network. User interfaces or other contents received through the network via the network interface 696 can be displayed on the display screen.

The display screen does not need to be integral with, or embedded in, a housing of the MFD 690, but may simply be coupled to the MFD 690 by either a wire or a wireless connection. The user I/O 699 may include keys and/or buttons (such as graphical keys or buttons, or other graphical elements, of a GUI on a touchscreen display) for inputting information or requesting various operations. Alternatively, the user I/O 699 and the display screen may be operated by a keyboard, a mouse, a remote control, voice recognition (e.g., through a speaker/microphone 699a), or eye-movement tracking, or a combination thereof.

Printer engine 694, scanner engine 695 and network interface 696 are otherwise conventional, and therefore, a detailed description of such conventional aspects is omitted in the interest of clarity and brevity.

The MFD 690 can have any or all of the functions of similar devices conventionally known, such as for scanning, editing and storing images, sending a fax, sending and receiving e-mails with or without attachments, accessing files by FTP or another protocol or facility, surfing the Web, etc. Further, multi-functional devices or multi-function peripheral devices can play a prominent role to convert hardcopy documents to electronic documents.

The MFD 690 may also operate as a device management apparatus (e.g. device management apparatus 101 of FIG. 1). The operation of such device management apparatus according to an exemplary embodiment is described supra with reference to FIG. 1.

Figure 13:
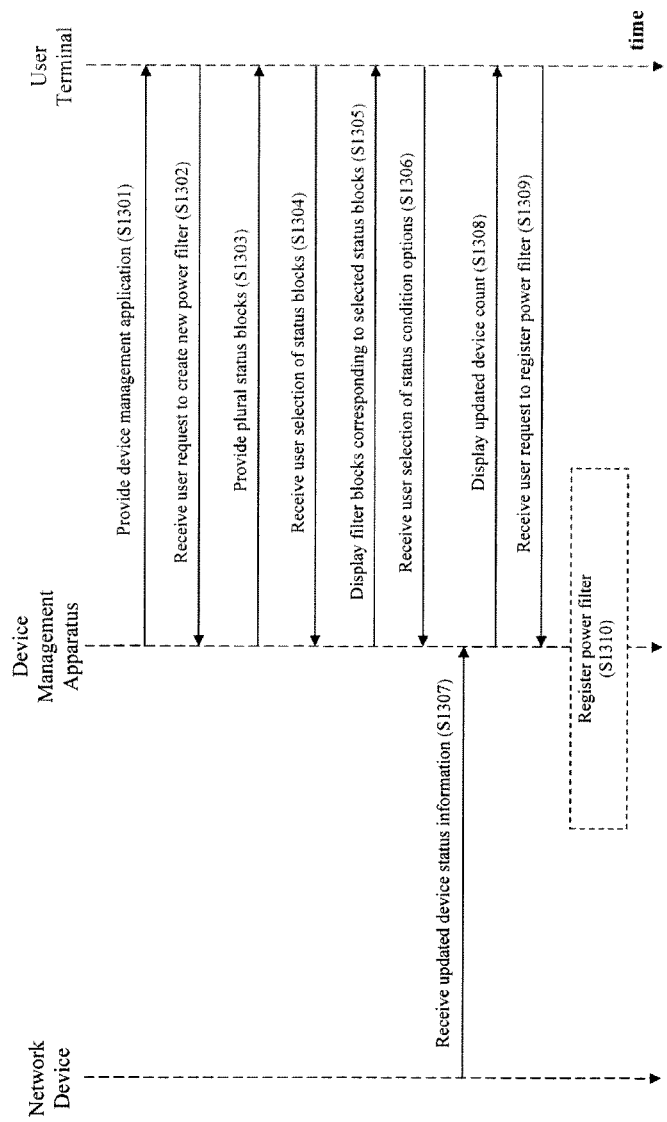
FIG. 13 shows a work flow for a method for creating and registering a power filter, according to an exemplary embodiment.

With reference to FIG. 13, a method for creating and registering a power filter, according to an exemplary embodiment, is described.

The device management apparatus provides a device management application to the user terminal (step S1301), and when device management apparatus receives a user request, via the device management application, to create a new power filter (step S1302), the device management apparatus provides plural status blocks to the user terminal, via the user interface displayed on the user terminal (step S1303). As discussed above, the status blocks allow the user to specify the filters to be added to the new power filter. When the device management apparatus receives user selection of one or more status blocks, device management apparatus displays filter block(s) corresponding to the selected filter block(s) (step S1305). Each filter block has one or more status condition options which may be selected by the user to limit the number/type of devices for which status information is displayed, when the new power filter is applied. Each status condition option is displayed along with a device count indicating the number of devices in the network environment that satisfy the status condition option. When the user selects one or more of the status condition options (step S1306), the device management apparatus may receive updated device status information from the network devices in the network environment (step S1307). Updated device status information may be received or collected from the devices at any time during the process of creating, registering or applying power filters, and upon receiving such updated device status information, the device management apparatus updates the device count displayed along with each status condition option. Even when there is no update of device status information, when the user selects one or more status condition options, the device management apparatus updates the device count accordingly, as discussed with reference to FIGS. 10A-10C (step S1308). Once the device management apparatus receives a user request to register (e.g. by activating the "save" button) the new power filter (step S1309), the device management apparatus registers the new power filter (step S1301).

In an exemplary embodiment, upon registering the new power filter, the device management apparatus may obtain the device status of the devices in the network environment and determine the particular device that match the selected status condition options included in the new power filter, for example, to facilitate the immediate use of the power filter by the user.

The power filter registered by the device management apparatus is preferably accessible by the user from any location within the network environment. For example, the power filter created by a user on his work desktop may later be utilized by the user on his mobile device, as long as the mobile device is connected to the network. Further, such power filters may be shared with other users in the network environment, and can be modified to create new power filters.

Figure 14:
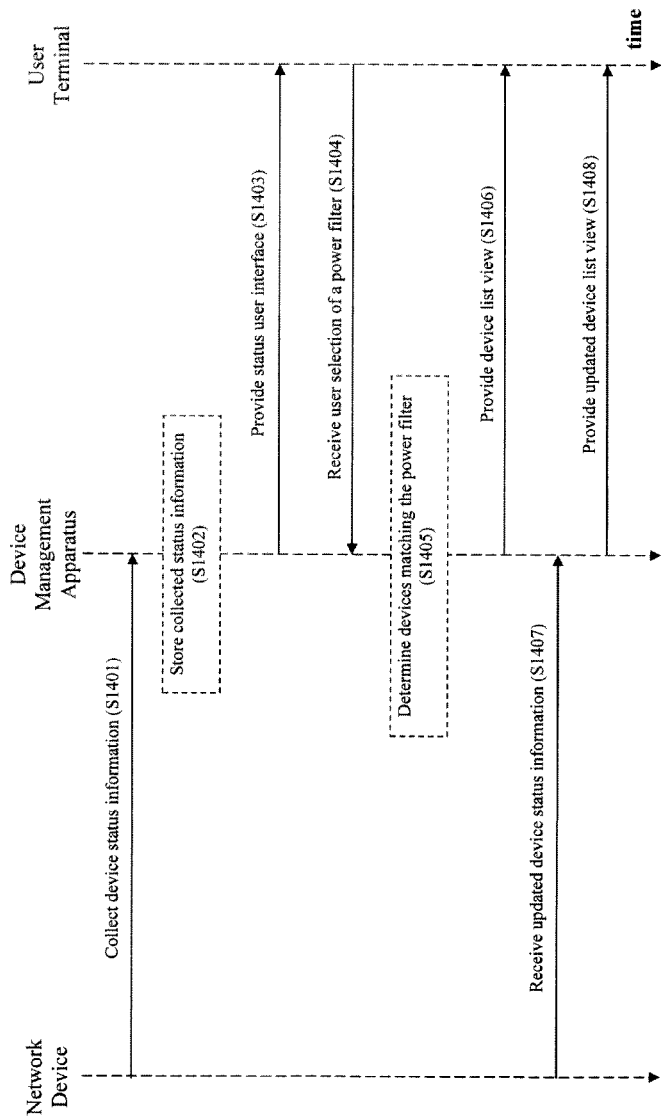
FIG. 14 shows a work flow for a method for utilizing a power filter to manage plural devices in a network environment, according to an exemplary embodiment.

With reference to FIG. 14, a method for utilizing a power filter to manage plural devices in a network environment, according to an exemplary embodiment, is described.

After the device management apparatus collects device status information (and other device data) from the network device (step S1401) and stores the collected device status information (and other device data) (step S1402), the device management apparatus provides a status user interface to the user terminal (step S1403). The user at the user terminal selects a power filter to be used to filter the devices for which status information is displayed, and the device management apparatus receives the user selection of the power filter (step S1404). Upon receiving the user selection of the power filter, the device management apparatus determines the devices matching the status condition options specified in the user-selected power filter (step S1405), and provides to the user a device list view based on the determination of the devices (step S1406). For example, such device list view lists the status information for each of the devices, amongst the plurality of devices in the network environment, matching the status condition options specified in the power filter selected by the user. When an updated device status information is received by the device management apparatus (step S1407), the device management apparatus provides to the user an updated device list view, reflecting any changes in the device status information (step S1408).

Thus, in the aforementioned aspects of the present disclosure, status information of the plurality of devices in the network environment displayed in the device list view may be controlled by creating and applying power filters in addition to groups and quick filters, thereby allowing IT administrators to quickly zone in on the devices that they wish to examine.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. A device management apparatus configured to monitor and manage a plurality of devices, said device management apparatus comprising:
   a device status acquiring unit configured to obtain device status of plural devices through a network; and
   a status user interface unit configured to provide a user interface to a user terminal, for dynamic specification of a particular power filter to selectively specify a limited subset of the plural devices, for display of status information, wherein
   the user interface provided by the status user interface unit to the user terminal includes
      a status information display part that displays the status information of a specific subset, specified by a selected filter, of the plural devices, and
      a filter creation part that provides plural status blocks, for user selection of one or more particular status blocks amongst the plural status blocks, to limit the subset of the plural devices for which the status information is displayed, wherein
   the filter creation part displays, for each selected status block, a corresponding filter block with status condition options, for user selection for the particular power filter, and for each displayed status condition option, the status condition option is displayed with a device count indicating a number of matching devices matching the status condition option, amongst the plural devices, wherein
   the particular power filter comprises a combination of the selected status condition options, and wherein
   when the particular power filter is the selected filter, the status information display part displays the status information for only particular devices that match the combination of the selected status condition options, amongst the plural devices.

2. The device management apparatus of claim 1, wherein the status user interface unit causes device counts of the displayed status condition options to be updated dynamically as device status of one or more devices is changed.

3. The device management apparatus of claim 1, wherein the status user interface unit causes the user interface to be updated dynamically as a filter block is selected and as any one or more of the status condition options is selected.

4. The device management apparatus of claim 1, wherein
   the user interface further includes a filter registration part that registers the particular power filter comprising the combination of the selected status condition options, upon user instruction to register said particular power filter, and wherein
   upon said user instruction to register said particular power filter, the device status acquiring unit obtains the device status of the plural devices, and the status information display part determines the particular devices that match the selected status condition options included in said particular power filter.

5. The device management apparatus of claim 1, wherein upon user selection of a status condition option for the particular power filter, the device status acquiring unit obtains the device status of the plural devices, and the status information display part determines the particular devices that match the selected status condition option.

6. The device management apparatus of claim 1, wherein the status condition options of at least one filter block include at least one cascade level, and at least one status condition option of the at least one filter block is cascaded with two or more cascaded status condition options.

7. The device management apparatus of claim 1, wherein the status information display part displays the status information in a device list view of only said particular devices, in said specific subset, that match the combination of the selected status condition options.

8. The device management apparatus of claim 7, wherein the status user interface unit applies the power filter so that the device list view does not include status information of other devices, which are not in the subset, amongst the plural devices managed by the device management apparatus.

9. The device management apparatus of claim 7, wherein the status user interface unit causes the status information displayed in the device list view to be updated dynamically as device status of one or more devices is changed.

10. The device management apparatus of claim 9, wherein the device status acquiring unit obtains the updated device status information from the one or more devices.

11. The device management apparatus of claim 7, wherein
in a case that the particular power filter is the selected filter, and the particular power filter includes two or more selected status condition options from one filter block,
each of the particular devices shown in the device list view matches at least one of the two or more selected status condition options from the one filter block.

12. The device management apparatus of claim 1, wherein
the user interface provided by the status user interface unit is a device management application to the user terminal, and
the device management application includes a device settings user interface for modifying one or more device settings of a selected device.

13. A system for managing devices in a network environment, said system comprising:
a user terminal connected to a network; and
a device management unit that monitors and manages, and collects device data from, the plural network devices,
wherein device management unit provides a device management application through the network to the user terminal, and the device management application includes a status user interface that displays status information selectively, based on a particular power filter, to limit the displayed status information to information of a specific subset of the plural devices, and
wherein the status user interface includes
a status information display part that displays a device list view of the specific subset, specified by the particular power filter, of the plural network devices, and
a filter creation part that provides plural status blocks, for user selection of one or more particular status blocks amongst the plural status blocks, to limit the subset of the plural devices for which the status information is displayed,
wherein the filter creation part displays, for each selected status block, a corresponding filter block with status condition options, for user selection for the particular power filter, and for each displayed status condition option, the status condition option is displayed with a device count indicating a number of matching devices matching the status condition option, amongst the plural devices, and
wherein the particular power filter comprises a combination of the selected status condition options, and the device list view displayed by the status information display part displays the status information for only particular devices that match the combination of the selected status condition options, and does not include status information of other devices, which are not in the subset, amongst the plural devices managed by the device management unit.

14. The system as claimed in claim 13, wherein the device management unit obtains device status of the plural devices through the network from the plural devices.

15. The system as claimed in claim 13, further comprising:
one or more additional device management units that collect device data from the network devices and cause the collected device data to be stored in a device data store,
wherein the device management unit obtains device status of the plural devices from the device data store.

16. The system as claimed in claim 13, further comprising:
one or more additional device management units that collect device data from the network devices,
wherein the device management unit obtains device status of the plural devices from said one or more additional device management units.

17. The system as claimed in claim 13, wherein the device management unit obtains device status of the plural devices through the network from the plural devices, and
the filter creation part causes device counts of the displayed status condition options to be updated dynamically as device status of one or more devices is changed.

18. The system as claimed in claim 13, wherein the device management unit obtains device status of the plural devices through the network from the plural devices, and
wherein the status user interface unit causes the status information displayed in the device list view to be updated dynamically as device status of one or more devices is changed.

19. A method for managing plural devices in a network environment, the method comprising:
monitoring device status of the plural devices through a network;
providing a device management application through the network to a user terminal, to provide a status user interface on the user terminal;
providing plural status blocks, for user selection of one or more particular status blocks amongst the plural status blocks, to limit a subset of the plural devices for which the status information is displayed;
displaying, for each selected status block, a corresponding filter block with status condition options, for user selection for a particular power filter;
displaying, for each displayed status condition option, the status condition option with a device count indicating a number of matching devices matching the status condition option, amongst the plural devices;
receiving, via the status user interface, a user selection of the particular power filter including one or more filter blocks, each filter block having one or more user-selected status condition options;
displaying a device list view of a specific subset, specified by the particular power filter, of the plural devices;
displaying the status information for only particular devices that match at least one of said one or more the user-selected status condition options of said one or more filter blocks included in the particular power filter, without displaying the status information of other devices, which are not in the specific subset of the plural devices.

20. The method of claim 19, further comprising:
dynamically updating, as device status of one or more devices is changed, (i) device counts of the displayed status condition options and (ii) the status information displayed in the device list view.

* * * * *